(12) United States Patent
Yamamura et al.

(10) Patent No.: US 8,129,067 B2
(45) Date of Patent: Mar. 6, 2012

(54) FUEL CELL

(75) Inventors: Hideichi Yamamura, Tokorozawa (JP);
Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 878 days.

(21) Appl. No.: 12/162,936

(22) PCT Filed: Jan. 30, 2007

(86) PCT No.: PCT/JP2007/051876
§ 371 (c)(1),
(2), (4) Date: Jul. 31, 2008

(87) PCT Pub. No.: WO2007/089006
PCT Pub. Date: Aug. 9, 2007

(65) Prior Publication Data
US 2009/0023049 A1    Jan. 22, 2009

(30) Foreign Application Priority Data
Jan. 31, 2006 (JP) .................. 2006-022992

(51) Int. Cl.
*H01M 2/38* (2006.01)
*H01M 2/40* (2006.01)
*H01M 8/24* (2006.01)

(52) U.S. Cl. ................................ 429/456
(58) Field of Classification Search .............. 429/456, 429/469, 470, 508
See application file for complete search history.

(56) References Cited

U.S. PATENT DOCUMENTS

| 6,670,068 | B1 | 12/2003 | Diez et al. |
| 7,097,925 | B2* | 8/2006 | Keefer .................. 429/9 |
| 7,387,849 | B2* | 6/2008 | Keefer et al. .............. 429/411 |
| 7,601,453 | B2* | 10/2009 | Tsunoda et al. ............ 429/456 |
| 2003/0031915 | A1 | 2/2003 | Diez et al. |
| 2004/0234837 | A1 | 11/2004 | Dan |
| 2005/0136319 | A1 | 6/2005 | Tsunoda et al. |

FOREIGN PATENT DOCUMENTS

| JP | 2005-85520 | 3/2005 |
| JP | 2005-85521 | 3/2005 |

OTHER PUBLICATIONS

International Search Report for Application No. PCT/JP2007/051876, dated Jun. 29, 2007.

* cited by examiner

*Primary Examiner* — Javaid Nasri
(74) *Attorney, Agent, or Firm* — Nelson Mullins Riley & Scarborough LLP; Anthony A. Laurentano

(57) ABSTRACT

A fuel cell includes electrolyte electrode assembly and separators. An exhaust gas separation member is provided between the separators. The exhaust gas separation member includes an annular portion formed around an outer circumferential portion of the electrolyte electrode assembly, a seal portion fixed to the annular portion and sandwiched between the outer end of the electrolyte electrode assembly and one of the separators, and a stopper provided integrally with the annular portion and fixedly engaged with the other separator.

23 Claims, 25 Drawing Sheets

⇨ OXYGEN-CONTAINING GAS
⇨ FUEL GAS
⇨ EXHAUST GAS

---→ FUEL GAS
——→ OXYGEN-CONTAINING GAS

---> FUEL GAS
⟶ OXYGEN-CONTAINING GAS

PRIOR ART

FUEL CELL

RELATED APPLICATIONS

This application is a 35 U.S.C. 371 national stage filing of International Application No. PCT/JP2007/051876, filed 30 Jan. 2007, which claims priority to Japanese Patent Application No. 2006-022992 filed on 31 Jan. 2006 in Japan. The contents of the aforementioned applications are hereby incorporated by reference.

TECHNICAL FIELD

The present invention relates to a fuel cell formed by stacking an electrolyte electrode assembly and separators. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In practical use, predetermined numbers of the electrolyte electrode assemblies and the separators are stacked together to form a fuel cell stack.

In the fuel cell, sealless structure is often adopted. In the sealless structure, a fuel gas such as a hydrogen gas is supplied to the anode, and an oxygen-containing gas such as the air is supplied to the cathode. The remaining fuel gas after consumption in the power generation reaction (off gas) and the oxygen-containing gas are discharged to the outside from the outer circumferential portion of the fuel cell. At this time, in the air discharged to the outside of the fuel cell, back diffusion to the anode may occur. Consequently, the backwardly diffused air and the fuel gas supplied to the anode may cause combustion reaction undesirably.

In this regard, for example, a solid oxide fuel cell disclosed in Japanese Laid-Open Patent Publication No. 2005-85521 is known. As shown in FIG. 25, the fuel cell comprises a power generation cell 1 including a solid electrolyte layer 1$a$, and a fuel electrode layer 1$b$ and an oxidizing gas electrode layer 1$c$ on both surfaces of the solid electrolyte layer 1$a$. Further, a fuel electrode current collector 2 and an oxidizing gas electrode current collector 3 are provided for the power generation cell 1, and separators 4 are provided outside the fuel electrode current collector 2 and the oxidizing gas electrode current collector 3 to form the fuel cell having sealless structure. An insulating cover 5 having a gas discharge hole 5$a$ is provided to cover the outer circumferential portion of the fuel electrode layer 1$b$ and the fuel electrode current collector 2.

According to the disclosure, since the insulating cover 5 covers the outer circumferential surface of the fuel electrode current collector 2, the off gas is discharged through only the gas discharge hole 5$a$ from the outer circumferential portion of the fuel electrode current collector 2, and it is possible to suppress the amount of the discharged fuel gas which does not contribute to the power generation reaction.

However, in the conventional technique, the fuel gas discharged from the outer circumferential portion of the fuel electrode current collector 2 and the oxygen-containing gas discharged from the outer circumferential portion of the oxidizing gas electrode current collector 3 easily contact in an area near the outer circumferential portion of the power generation cell 1. Therefore, the fuel gas and the oxygen-containing gas are combusted near the outer circumferential portion of the power generation cell 1, and local heat increase or the like occurs. Consequently, the power generation cell 1 may be damaged undesirably. Further, the insulating cover 5 is made of material which is heterogeneous to material of the power generation cell 1 or material of the oxidizing gas electrode current collector 3. Thus, because of the difference of the linear coefficient of thermal expansion, the contact resistance increases due to cracks or contact failure. As a result, the power generation efficiency and the durability may be degraded disadvantageously.

DISCLOSURE OF INVENTION

The present invention has been made to solve the above problems, and an object of the present invention is to provide a fuel cell in which the fuel gas and oxygen-containing gas which have been partially consumed in the reaction do not contact each other in an area near an electrolyte electrode assembly, and it is possible to reliably prevent the power generation efficiency and the durability from being degraded due to combustion of the exhaust gas.

The present invention relates to a fuel cell formed by stacking an electrolyte electrode assembly and separators. The electrolyte electrode assembly includes an anode, a cathode, and an electrolyte interposed between the anode and the cathode. The fuel cell comprises an exhaust gas separation member provided between the separators.

The exhaust gas separation member comprises an annular portion formed around an outer circumferential portion of said electrolyte electrode assembly, and having an opening for discharging a first exhaust gas which has been consumed at one electrode of the anode and the cathode to the outside of the electrolyte electrode assembly, and a seal portion provided at an end of the annular portion for preventing the first exhaust gas from entering the other electrode of the anode and the cathode.

Preferably, the exhaust gas separation member has elastic properties by combination of the annular portion and the seal portion. In the structure, it is possible to prevent the partial (linear) contact between the separator and the electrolyte electrode assembly.

Further, according to another aspect of the present invention, the exhaust gas separation member comprises an annular portion formed around an outer circumferential portion of the electrolyte electrode assembly, and having an opening for discharging a first exhaust gas which has been consumed at one electrode of the anode and the cathode to the outside of the electrolyte electrode assembly; a seal portion fixed to or integrally formed with the annular portion for preventing the first exhaust gas from entering the other electrode of the anode and the cathode; and a stopper provided at an end of the annular portion for allowing the exhaust gas separation member to be fixedly engaged with the separator adjacent to the one electrode.

Preferably, the exhaust gas separation member has elastic properties by combination of the annular portion, the seal portion, and the stopper. In the structure, it is possible to prevent the partial (linear) contact between the separator and the electrolyte electrode assembly.

Further, preferably, the separator comprises a fuel gas channel for supplying the fuel gas from a central region to an outer circumferential region on a surface of the anode, and an oxygen-containing gas channel for supplying an oxygen-containing gas from a central region to an outer circumferential region on a surface of the cathode. In the structure, the fuel gas and the oxygen-containing gas flow uniformly. The uniform power generation reaction is achieved, occurrence of heat distortion is reduced, and improvement of fuel gas utilization ratio is achieved.

Further, preferably, a chamber where the first exhaust gas can be retained is formed among the annular portion, the seal portion, and the outer circumferential surface of the electrolyte electrode assembly. In the structure, the annular portion does not directly contact the electrolyte electrode assembly. It is possible to prevent deformation or damages due to the thermal expansion difference between the annular portion and the electrolyte electrode assembly. Further, it is possible to maintain the pressure of the first exhaust gas in the chamber at a level higher than that of the outside pressure, so that back diffusion of the outside atmospheric air into the chamber is prevented.

Further, preferably, the seal portion is provided between an outer end of the electrolyte electrode assembly and the annular portion, and the thickness of the seal portion is small in correspondence with the outer end.

Further, preferably, the stopper is fixedly engaged with the separator with elasticity. In the structure, firstly, the seal portion is positioned by receiving the load applied to the fuel cell, and the current collecting performance is maintained. Further, improvement in the tightness and sealing performance at the stopper is achieved by deformation of the stopper.

Further, preferably, the stopper is fixedly engaged with the separator, by a crimping process (by deforming the stopper under pressure). In the structure, the stopper and the separator reliably and tightly contact each other, and further improvement in the sealing performance is achieved.

Further, preferably, the stopper is fixedly engaged with the separator such that the stopper is overlapped with a curved end of the separator. In the structure, the desired sealing performance is achieved, and the thermal expansion difference between the stopper and the separator is absorbed.

Further, preferably, an insulator is interposed between the stopper and the separator. In the simple structure, it is possible to prevent the short circuit between the anode and the cathode.

After the fuel gas is supplied to the anode for power generation reaction, when the fuel gas is discharged from the anode as an exhaust gas, the exhaust gas contains the unconsumed gas. The exhaust gas containing the unconsumed gas is referred to as an off gas.

According to the present invention, the first exhaust gas after consumption at one electrode flows through the opening of the annular portion, and is discharged to the outside of the electrolyte electrode assembly. The second exhaust gas after consumption at the other electrode is discharged to the outside of the electrolyte electrode assembly without contacting the first exhaust gas through the seal portion. Thus, the first exhaust gas and second exhaust gas do not contact each other in an area near an electrolyte electrode assembly, and it is possible to reliably prevent the power generation efficiency and the durability from being degraded due to combustion of the exhaust gases.

BEST MODE FOR CARRYING OUT THE INVENTION

Figure 1:
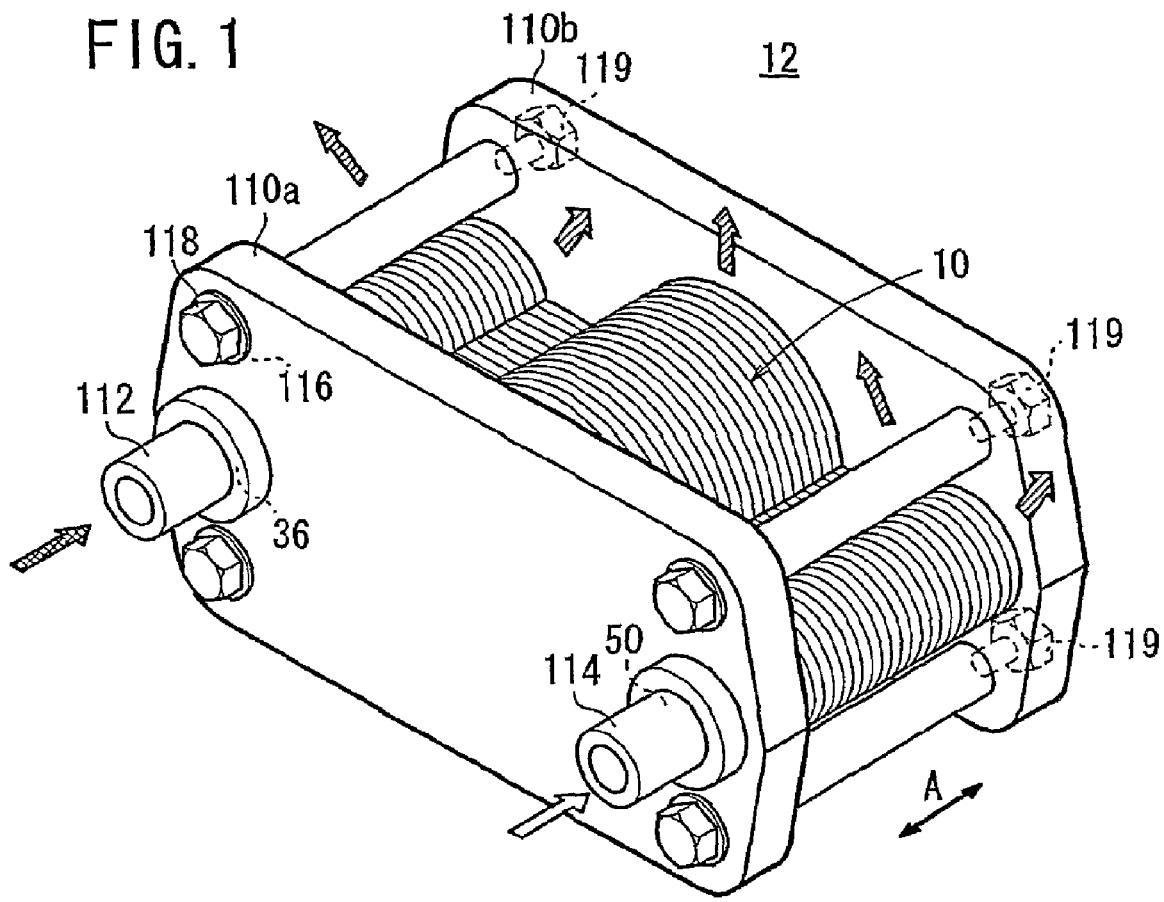
FIG. 1 is a perspective view schematically showing a fuel cell stack formed by stacking fuel cells according to a first embodiment of the present invention.

FIG. 1 is a perspective view schematically showing a fuel cell stack 12 formed by stacking a plurality of fuel cells 10 according to a first embodiment of the present invention in a direction indicated by an arrow A.

Figure 2:
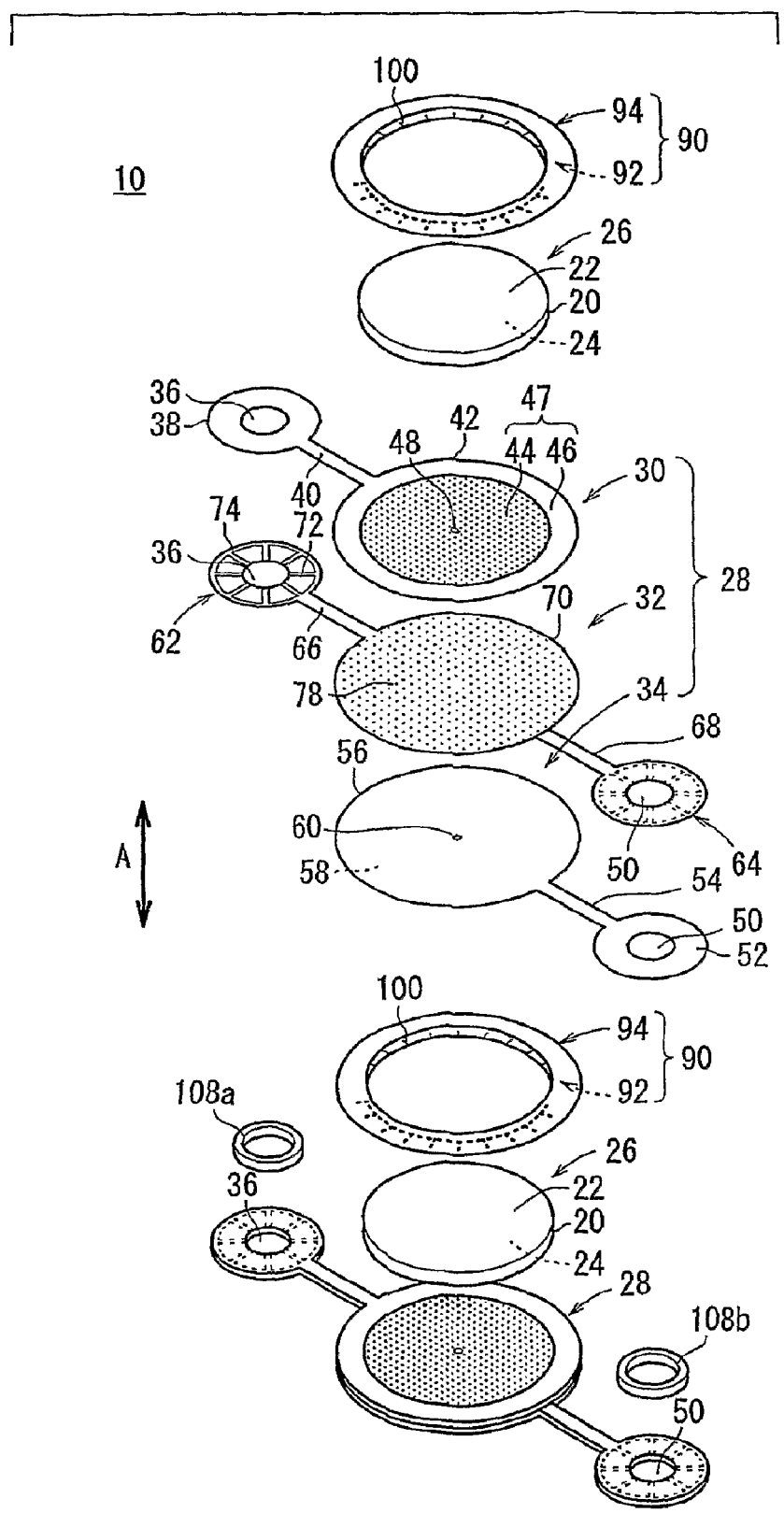
FIG. 2 is an exploded perspective view showing the fuel cell.
Figure 3:
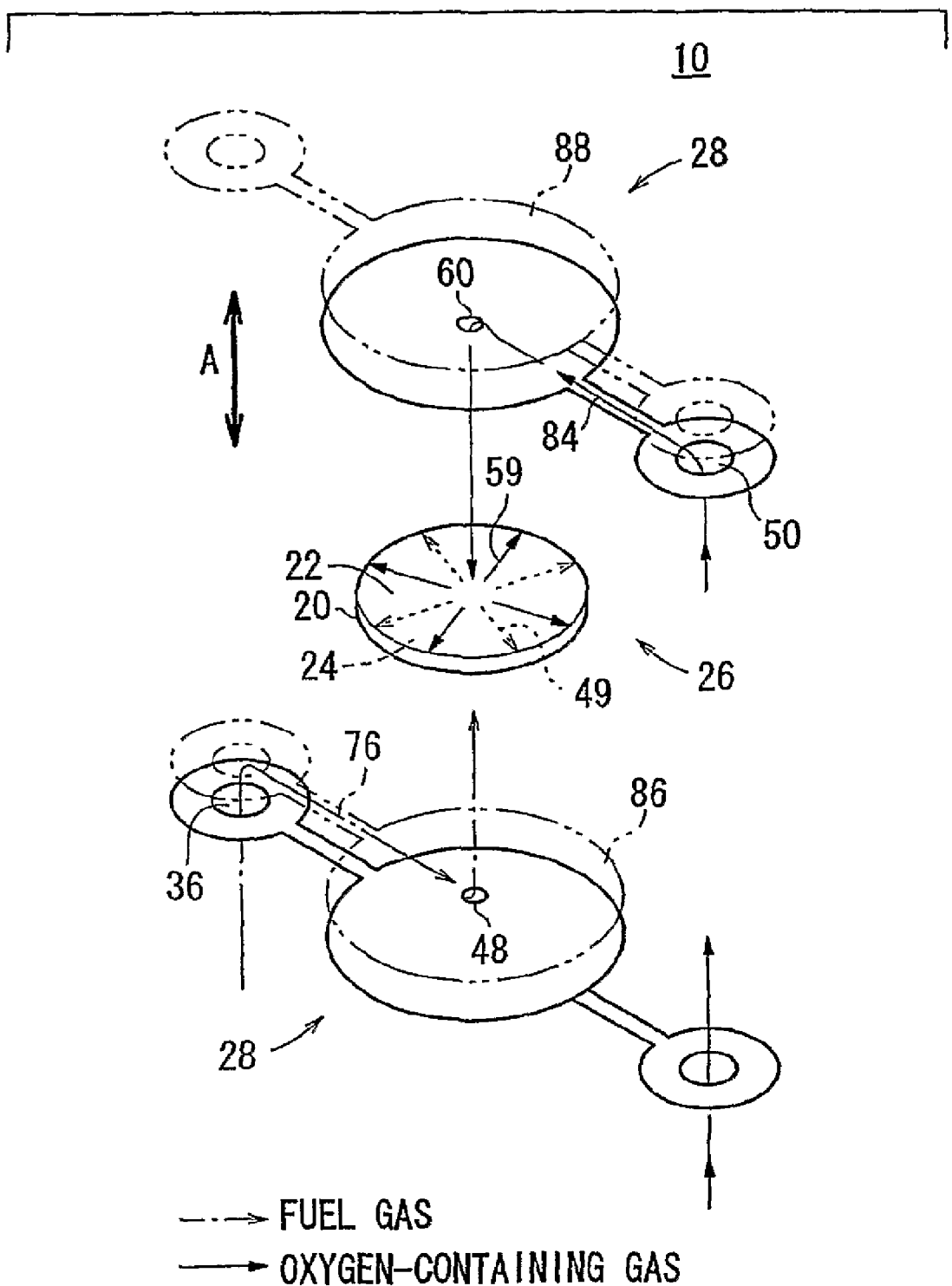
FIG. 3 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 2 and 3, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. Densification treatment is applied to the outer circumferential surface of the cathode 22 to prevent the leakage of an oxygen-containing gas.

The fuel cell 10 is formed by sandwiching the electrolyte electrode assembly 26 between a pair of separators 28. Each of the separators 28 includes first, second, and third plates 30, 32, 34. For example, the first to third plates 30, 32, 34 are metal plates of, e.g., stainless alloy. The first plate 30 and the third plate 34 are joined to both surfaces of the second plate 32 by brazing, for example (see FIGS. 2 and 4).

As shown in FIG. 2, the first plate 30 has a first small diameter end portion 38. A fuel gas supply passage 36 for supplying a fuel gas in the direction indicated by the arrow A extends through the first small diameter end portion 38. The first small diameter end portion 38 is integral with a first circular disk 42 having a relatively large diameter through a narrow bridge 40. The diameter of the first circular disk 42 is larger than the diameter of the anode 24 of the electrolyte electrode assembly 26 by a predetermined dimension.

Figure 5:
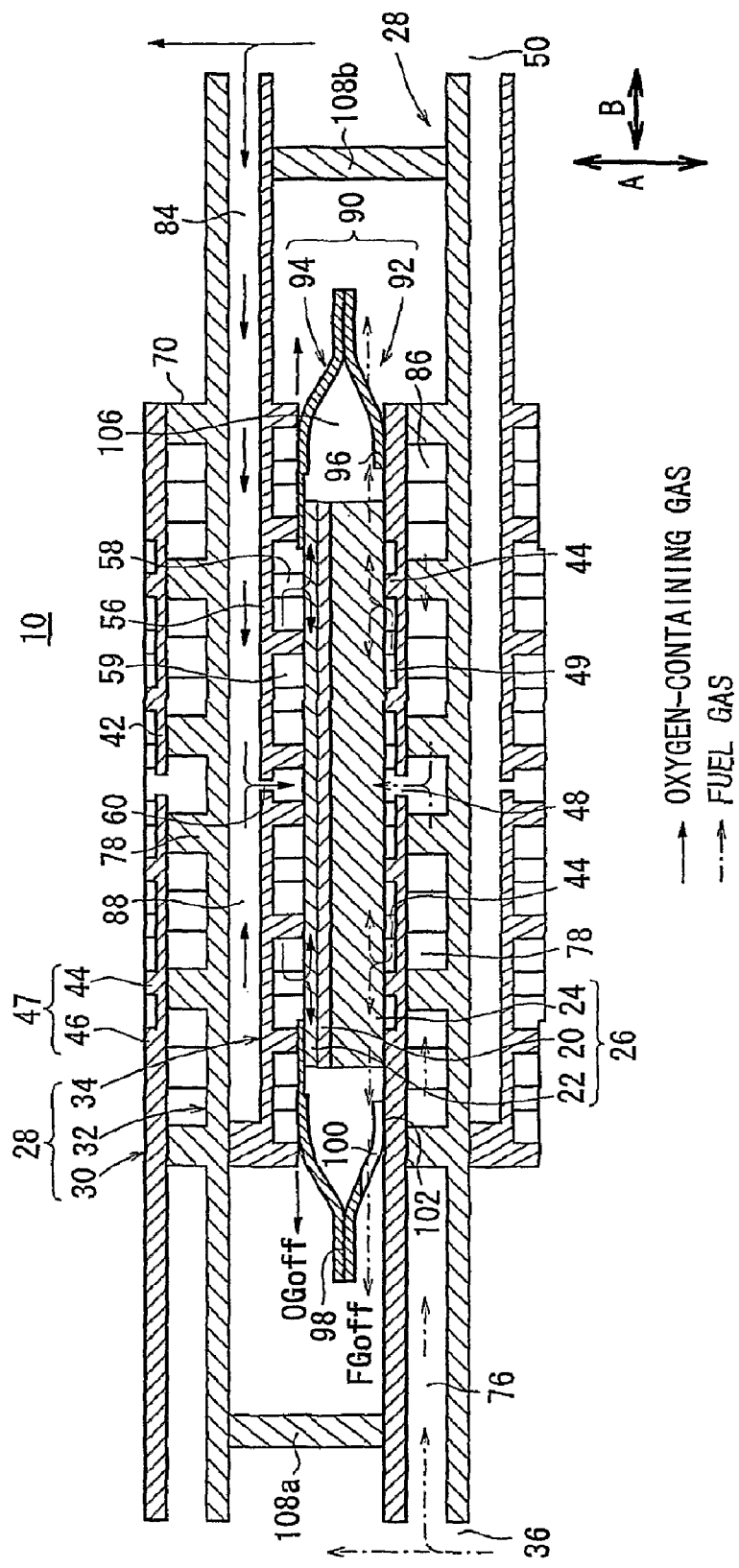
FIG. 5 is a cross-sectional view schematically showing operation of the fuel cell.

A large number of protrusions 44 are formed on a surface of the first circular disk 42 which contacts the anode 24, in a central region adjacent to an outer circumferential region. A substantially ring shaped protrusion 46 is provided on the outer circumferential region of the first circular disk 42. The protrusions 44 and the substantially ring shaped protrusion 46 are first protrusions 47 that jointly function as a current collector. As shown in FIG. 5, the protrusions 44 and the ring shaped protrusion 46 protrude toward the anode (one electrode) 24 to form a fuel gas channel 49 as a passage of the fuel gas among the protrusions 44, the ring shaped protrusion 46, and the anode 24.

A fuel gas inlet 48 is provided at the center of the first circular disk 42 for supplying the fuel gas toward substantially the central region of the anode 24. The protrusions 44 may be formed by making a plurality of recesses in a surface which is in the same plane with the surface of the substantially ring shaped protrusion 46.

As shown in FIG. 2, the third plate 34 has a second small diameter end portion 52. An oxygen-containing gas supply passage 50 for supplying the oxygen-containing gas in the direction indicated by the arrow A extends through the second small diameter end portion 52. The second small diameter end portion 52 is integral with a second circular disk 56 having a relatively large diameter through a narrow bridge 54. The diameter of the second circular disk 56 is larger than the cathode 22 by a predetermined dimension.

A plurality of second protrusions 58 are formed on the entire surface of the second circular disk 56 which contacts the cathode 22 of the electrolyte electrode assembly 26. The second protrusions 58 function as a current collector. As shown in FIG. 5, the second protrusions 58 protrude toward the cathode (the other electrode) 22 to form an oxygen-containing gas channel 59 as a passage of the oxygen-containing gas between the cathode 22 and the second protrusions 58. An oxygen-containing gas inlet 60 is provided at the center of the second circular disk 56 for supplying the oxygen-containing gas toward substantially the central region of the cathode 22.

Figure 4:
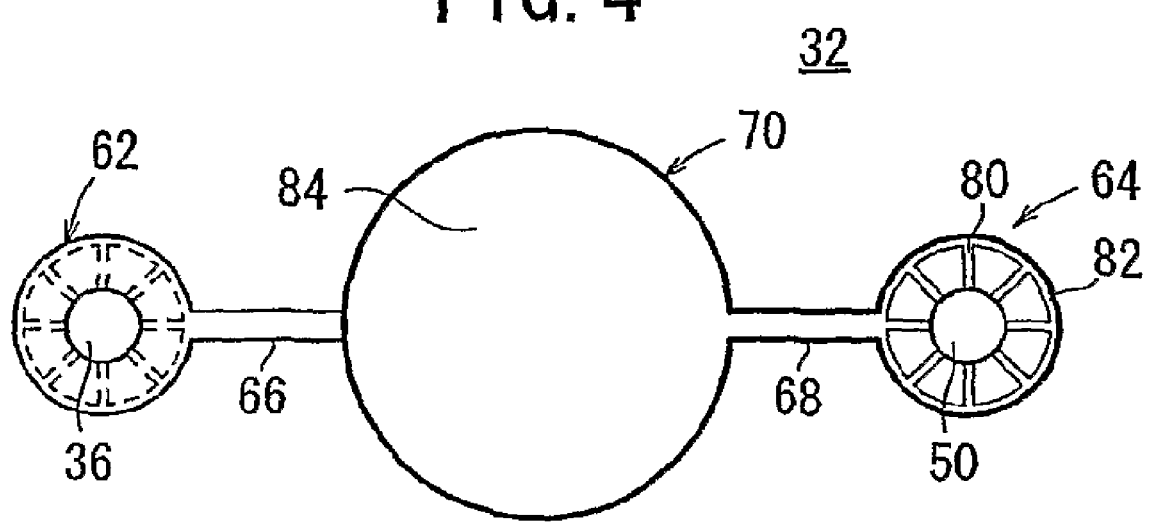
FIG. 4 is a front view showing a second plate of the fuel cell.

As shown in FIGS. 2 and 4, the second plate 32 includes a third small diameter end portion 62 and a fourth small diameter end portion 64. The fuel gas supply passage 36 extends through the third small diameter end portion 62, and the oxygen-containing gas supply passage 50 extends through the fourth small diameter end portion 64. The third and fourth small diameter end portions 62, 64 are integral with a third circular disk 70 having a relatively large diameter through narrow bridges 66, 68, respectively. The first to third circular disks 42, 56, 70 have the same diameter.

The second plate 32 has a plurality of slits 72 radially formed in the third small diameter end portion 62, on a surface facing the first plate 30. The slits 72 are connected to the fuel gas supply passage 36. Further, the slits 72 are connected to a recess 74 formed along an outer circumferential region of the third small diameter end portion 62. The recess 74 prevents the entry of brazing material into the slits 72, and into an area inside the recess 74. A fuel gas supply channel 76 is formed in the bridge 66 and in the surface of the third circular disk 70 (see FIGS. 2 through 5). The fuel gas flows from the fuel gas supply passage 36 to the fuel gas supply channel 76 through the slits 72. A plurality of third protrusions 78 are formed on the third circular disk 70, and the third protrusions 78 are part of the fuel gas supply channel 76.

As shown in FIG. 4, the second plate 32 has a plurality of slits 80 radially formed in the fourth small diameter end portion 64, on a surface which contacts the third plate 34. The slits 80 are connected to the oxygen-containing gas supply passage 50. Further, the slits 80 are connected to a recess 82. The recess 82 prevents the entry of brazing material into slits 80, and into an area inside the recess 82. An oxygen-containing gas supply channel 84 is formed in the third circular disk 70. The oxygen-containing gas flows from the oxygen-containing gas supply passage 50 through the slits 80 into the third circular disk 70. The oxygen-containing gas supply channel 84 is closed by the outer circumferential region of the third circular disk 70.

The first plate 30 is joined to one surface of the second plate 32 by brazing to form the fuel gas supply channel 76 connected to the fuel gas supply passage 36 between the first and second plates 30, 32.

The fuel gas supply channel 76 is provided between the first and third circular disks 42, 70, over the electrode surface of the anode 24. The first circular disk 42 is provided between the fuel gas supply channel 76 and the anode 24, and the fuel gas is supplied to the fuel gas supply channel 76. That is, a fuel gas pressure chamber 86 is formed such that the first circular disk 42 tightly contacts the anode 24 under pressure (see FIG. 5). The fuel gas pressure chamber 86 is connected to the fuel gas channel 49 through the fuel gas inlet 48.

The second plate 32 is joined to the third plate 34 by brazing to form the oxygen-containing gas supply channel 84 connected to the oxygen-containing gas supply passage 50 between the second and third plates 32, 34 (see FIG. 5).

The oxygen-containing gas supply channel 84 is provided between the second and third circular disks 56, 70, over the electrode surface of the cathode 22. The second circular disk 56 is provided between the oxygen-containing gas supply channel 84 and the cathode 22, and the oxygen-containing gas is supplied to the oxygen-containing gas supply channel 84. That is, an oxygen-containing gas pressure chamber 88 is formed such that the second circular disk 56 tightly contacts the cathode 22 under pressure. The oxygen-containing gas pressure chamber 88 is connected to the oxygen-containing gas channel 59 through the oxygen-containing gas inlet 60.

As shown in FIGS. 2 and 5, an exhaust gas separation member 90 is provided between a pair of the separators 28. The exhaust gas separation member 90 includes an annular portion 92, a seal portion 94, and a stopper 96. The annular portion 92 is provided around the outer circumferential portion of the electrolyte electrode assembly 26. The seal portion 94 is fixed to the annular portion 92, and sandwiched between the outer end of the electrolyte electrode assembly 26 and one of the separators 28. The stopper 96 is formed integrally with the annular portion 92, and fixedly engaged with the other separator 28.

The annular portion 92 and the seal portion 94 have substantially ring shapes and desired elasticity. The annular portion 92 is made of material with high rigidity in comparison with the seal portion 94. As the materials of the annular portion 92 and the seal portion 94, metal foils with the desired thickness, in particular, nickel, stainless steel, and noble metals such as platinum can be used. Outer ends of the annular portion 92 and the seal portion 94 are joined together in a joint portion 98 by welding or the like.

The stopper 96 and a plurality of slits (openings) 100 are formed at the inner end of the annular portion 92. Each of the slits 100 has a predetermined length, and extends toward the joint portion 98 at predetermined intervals (angles). Insulating coating (insulator) 102 is provided on a surface of the stopper 96 which contacts the separator 28.

The seal portion 94 protrudes inwardly beyond the inner end of the annular portion 92. The thin inner circumferential end of the seal portion 94 is positioned between the outer circumferential end of the electrolyte electrode assembly 26 and the separator 28. A chamber 106 is formed inside the annular portion 92 and the seal portion 94, and outside the outer circumferential surface of the electrolyte electrode assembly 26. The fuel gas after consumption (first exhaust gas) at the anode 24 can be retained in the chamber 106.

As shown in FIG. 5, the electrolyte electrode assembly 26 employs an anode support cell (ASC) in which the thickness of the anode 24 is significantly larger than the thickness of the electrolyte 20 and the thickness of the cathode 22. Densification treatment is applied to the outer circumferential surface of the cathode 22 to prevent the leakage of the oxygen-containing gas.

Insulating seals 108a for sealing the fuel gas supply passage 36 and insulating seals 108b for sealing the oxygen-containing gas supply passage 50 are provided between the separators 28 (see FIGS. 2 and 5). For example, the insulating seals 108a, 108b are made of mica material, or ceramic material.

As shown in FIG. 1, the fuel cell stack 12 includes a plurality of fuel cells 10 stacked together, and end plates 110a, 110b provided at opposite ends in the stacking direction. The end plate 110a or the end plate 110b is electrically insulated from tightening bolts 118. A first pipe 112 and a second pipe 114 extend through the end plate 110a. The first pipe 112 is connected to the fuel gas supply passage 36 of the fuel cell 10, and the second pipe 114 is connected to the oxygen-containing gas supply passage 50 of the fuel cell 10. The end plates 110a, 110b have bolt holes 116 at positions above and under the fuel gas supply passage 36, and at positions above and under the oxygen-containing gas supply passage 50. Tightening bolts 118 are inserted into the respective bolt holes 116, and tip ends of the respective tightening bolts 118 are screwed into nuts 119 for tightening the fuel cell stack 12.

Next, operation of the fuel cell stack 12 will be described below.

As shown in FIG. 2, in assembling the fuel cell 10, firstly, the first plate 30 of the separator 28 is joined to one surface of the second plate 32, and the third plate 34 is joined to the other surface of the second plate 32. Thus, the second plate 32 divides a space in the separator 28 to form the fuel gas channel 76 connected to the fuel gas supply passage 36 and the oxygen-containing gas supply channel 84 connected to the oxygen-containing gas supply passage 50 separately (see FIG. 3).

Further, the fuel gas pressure chamber 86 is formed between the first and third circular disks 42, 70, and the oxygen-containing gas pressure chamber 88 is formed between the second and third circular disks 56, 70 (see FIG. 5).

Then, the separators 28 and the electrolyte electrode assemblies 26 are stacked alternately, and the exhaust gas separation member 90 is provided between the separators 28.

The end plates 110a, 110b are provided at the opposite ends in the stacking direction. The tightening bolts 118 are inserted into the respective bolt holes 116 of the end plates 110a, 110b, and the tip ends of the tightening bolts 118 are screwed into the nuts 119 to form the fuel cell stack 12 (see FIG. 1).

In the first embodiment, as shown in FIG. 5, the exhaust gas separation member 90 is provided between the separators 28. Then, when a stacking load is applied to the fuel cell stack 12 through the tightening bolts 118, firstly, the stacking load is transmitted to the separators 28 having rigid structure and the first protrusions 47 and the second protrusions 58 as current collectors of the fuel cell 10. At this time, the exhaust gas separation member 90 having a bellows shape itself functions like elastic spring properties. Therefore, the exhaust gas separation member 90 can absorb the load in the stacking direction and the partial (linear) contact at the time of tightening the separators 28 and the current collectors of the fuel cell 10 is prevented. Further, the seal portion 94 having flexible structure between the separator 28 and the electrolyte electrode assembly 26 is positioned between the separators 28, and the sealing performance is maintained.

Further, since the annular portion 92 is an elastic body having flexible structure, the annular portion 92 is deformable under pressure by a relatively small load. That is, by applying a further slight tightening load to the annular portion 92, the annular portion 92 allows the stopper 96 to tightly contact the first plate 30 of the separator 28, and the desired tightening performance is achieved.

In FIG. 1, the fuel gas (e.g., hydrogen-containing gas) is supplied to the first pipe 112 connected to the end plate 110a, and flows from the first pipe 112 to the fuel gas supply passage 36. The oxygen-containing gas (hereinafter also referred to as the "air") is supplied to the second pipe 114 connected to the end plate 110a, and the oxygen-containing gas flows from the second pipe 114 to the oxygen-containing gas supply passage 50.

As shown in FIG. 5, after the fuel gas flows into the fuel gas supply passage 36, the fuel gas flows in the stacking direction indicated by the arrow A, and is supplied to the fuel gas supply channel 76 in the separator 28 of each of the fuel cells 10. The fuel gas flows along the fuel gas supply channel 76, and flows into the fuel gas pressure chamber 86 between the first and third circular disks 42, 70. The fuel gas flows between the third protrusions 78, and flows into the fuel gas inlet 48 at the central position of the first circular disk 42.

The fuel gas inlet 48 is provided at a position corresponding to the central position of the anode 24 in each of the electrolyte electrode assemblies 26. Therefore, the fuel gas from the fuel gas inlet 48 is supplied to the fuel gas channel 49, and flows from the central region of the anode 24 toward the outer circumferential region of the anode 24.

After the oxygen-containing gas flows into the oxygen-containing gas supply passage 50, the oxygen-containing gas flows through the oxygen-containing gas supply channel 84 in the separator 28, and is supplied to the oxygen-containing gas pressure chamber 88 between the second and third circular disks 56, 70. The oxygen-containing gas flows into the oxygen-containing gas inlet 60 at the central position of the second circular disk 56.

The oxygen-containing gas inlet 60 is provided at a position corresponding to the central position of the cathode 22 in each of the electrolyte electrode assemblies 26. Therefore, the oxygen-containing gas from the oxygen-containing gas inlet 60 is supplied to the oxygen-containing gas channel 59, and flows from the central region of the cathode 22 to the outer circumferential region of the cathode 22.

Thus, in each of the electrolyte electrode assemblies 26, the fuel gas is supplied from the central region of the anode 24 to the outer circumferential region of the anode 24, and the oxygen-containing gas is supplied from the central region of the cathode 22 to the outer circumferential region of the cathode 22 for generating electricity. The fuel gas consumed in power generation is discharged as the off gas (hereinafter referred to as the "first exhaust gas FGoff") and the oxygen-containing gas consumed in power generation (hereinafter referred to as the "second exhaust gas OGoff") are discharged from the outer circumferential portions of the first to third circular disks 42, 56, and 70.

In the first embodiment, as shown in FIG. 5, the chamber 106 is formed between the outer circumference of the electrolyte electrode assembly 26 and the exhaust gas separation member 90. The first exhaust gas FGoff discharged from the anode 24 of the electrolyte electrode assembly 26 is temporarily retained in the chamber 106.

The second exhaust gas OGoff discharged from the cathode 22 of the electrolyte electrode assembly 26 flows through a space between the seal portion 94 which tightly contact the outer end of the electrolyte electrode assembly 26 and the second circular disk 56 of the separator 28 to the outside of the fuel cell stack 12. Further, the first exhaust gas FGoff in the chamber 106 flows through the slits 100 formed in the annular portion 92 to the outside of the fuel cell stack 12.

Thus, the first exhaust gas FGoff discharged from the anode 24 flows from the chamber 106 through the slits 100 of the annular portion 92 to the outside of the electrolyte electrode assembly 26 and the second exhaust gas OGoff discharged from the cathode 22 is discharged to the outside of the electrolyte electrode assembly 26 without contacting the first exhaust gas FGoff through the seal portion 94.

Thus, in the area near the electrolyte electrode assembly 26, it is possible to reliably prevent combustion of the first exhaust gas FGoff and the second exhaust gas OGoff, and improve the power generation efficiency and the durability of the electrolyte electrode assembly 26 suitably.

Further, the insulating coating 102 is provided on the stopper 96 of the annular portion 92, on the surface which contacts the separator 28. Thus, the short circuit between the anode 24 and the cathode 22 can be prevented effectively.

Figure 6:
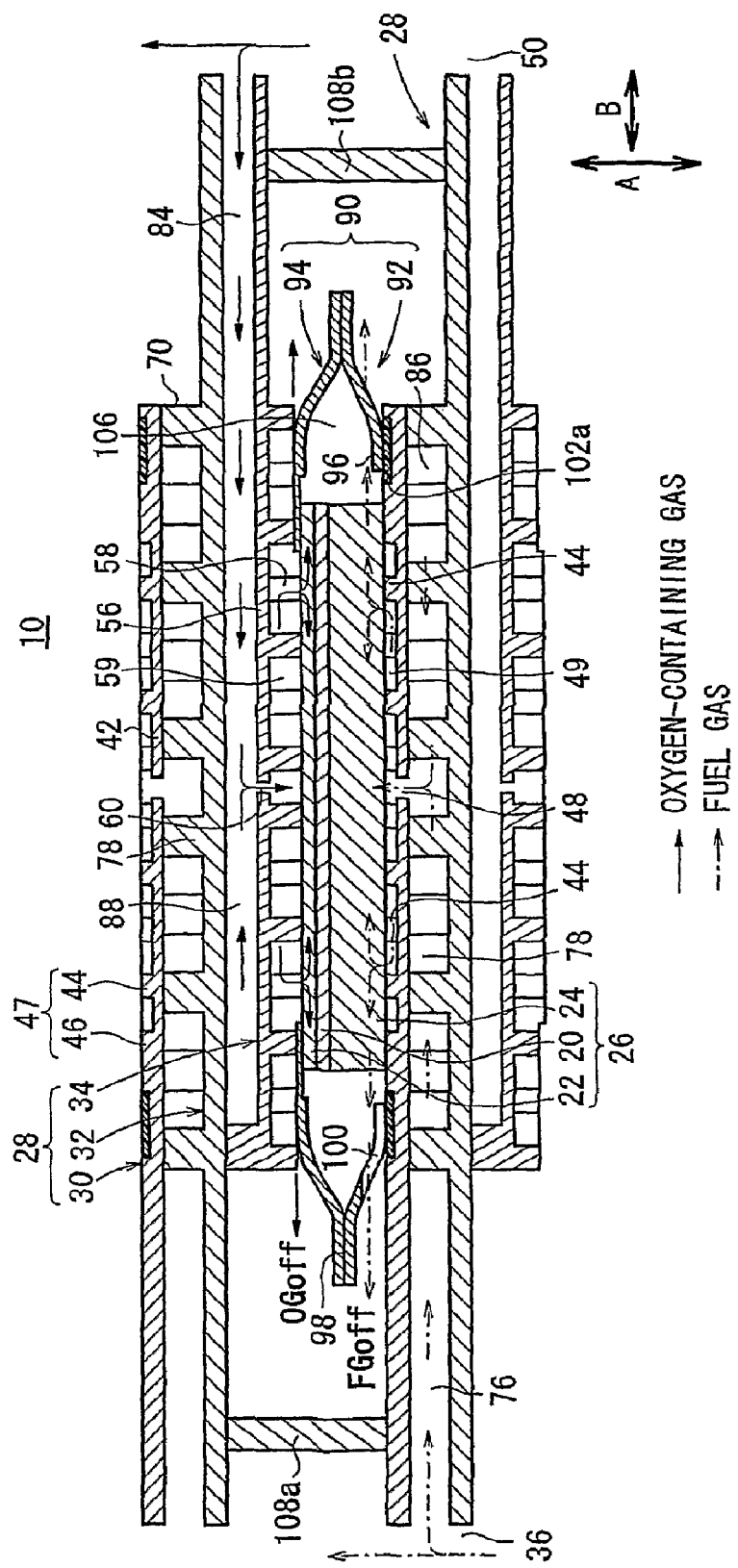
FIG. 6 is a cross-sectional view showing the fuel cell using a separate insulating ring.

Further, instead of providing the insulating coating 102 on the stopper 96, for example, as shown in FIG. 6, an insulating ring (insulator body) 102a or insulating coating (not shown) may be provided on the first plate 30 of the separator 28, on the surface which contacts the stopper 96. The insulating ring 102a is made of a plate of mica, alumina or zirconia or the like.

Further, in the first embodiment, the separator 28 has the fuel gas channel 49 for supplying the fuel gas from the central region to the outer circumferential region on the surface of the anode 24, and the oxygen-containing gas channel 59 for supplying the oxygen-containing gas from the central region to the outer circumferential region on the surface of the cathode 22. Therefore, the fuel gas and the oxygen-containing gas flow uniformly. As a result, the uniform power generation reaction is achieved, heat distortion is reduced, and the fuel gas utilization ratio is improved advantageously.

Further, in the first embodiment, the annular portion 92 and the seal portion 94 are spaced away from the outer circumferential surface of the electrolyte electrode assembly 26 to form the chamber 106 among the outer circumferential surface of the electrolyte electrode assembly 26, the annular portion 92 and the seal portion 94. Thus, the annular portion 92 does not directly contact the electrolyte electrode assembly 26, and it is possible to avoid deformation or damages due to the thermal expansion difference between the annular portion 92 and the electrolyte electrode assembly 26.

Further, the pressure of the first exhaust gas FGoff temporarily retained in the chamber 106 is kept at a high level in comparison with the external pressure. Therefore, the first exhaust gas FGoff is discharged uniformly from the slits 100 of the annular portion 92 to the outside, and it is possible to prevent the backflow of the outside atmospheric air into the chamber 106.

Figure 7:
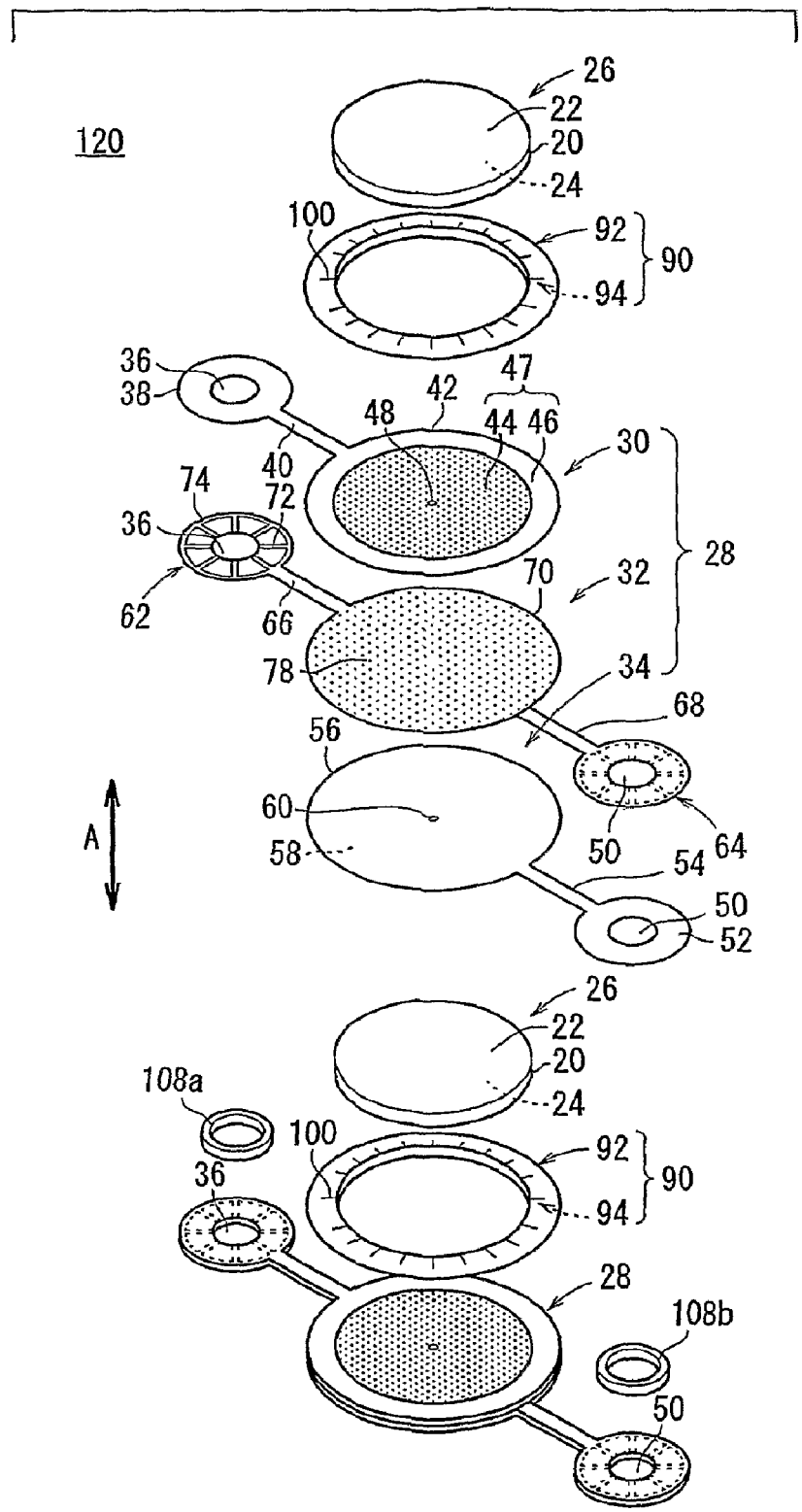
FIG. 7 is an exploded perspective view showing a fuel cell according to a second embodiment of the present invention.
Figure 8:
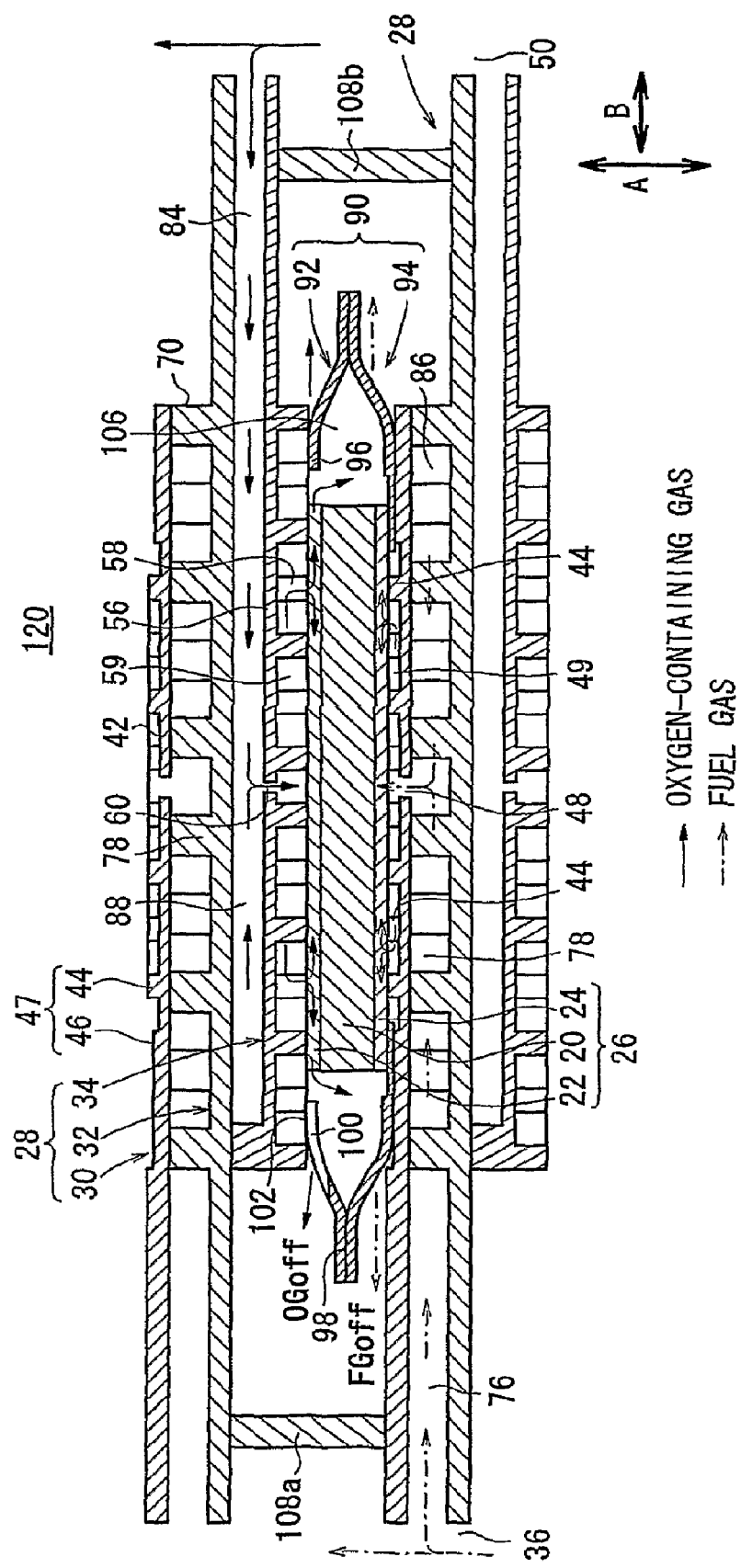
FIG. 8 is a cross-sectional view schematically showing operation of the fuel cell.

FIG. 7 is an exploded perspective view showing a fuel cell 120 according to a second embodiment of the present invention. FIG. 8 is a cross-sectional view schematically showing operation of the fuel cell 120. The constituent elements that are identical to those of the fuel cell 10 according to the first embodiment are labeled with the same reference numeral, and description thereof will be omitted. Further, in third to eighth embodiments as described later, the constituent elements that are identical to those of the fuel cell 10 according to the first embodiment are labeled with the same reference numeral, and description thereof will be omitted.

In the fuel cell 120, the exhaust gas separation member 90 is provided at a position opposite to the case of the first embodiment. Specifically, the inner end of the seal portion 94 is tightly interposed between the first plate 30 of the separator 28 and the outer end of the anode 24 of the electrolyte electrode assembly 26, and the stopper 96 tightly contacts the third plate 34 of the separator 28.

The slits 100 of the annular portion 92 are provided on the outer end of the third plate 34 of the separator 28. The chamber 106 is open to the outside through the slits 100.

The electrolyte electrode assembly 26 employs an electrolyte support cell (ESC) in which the thickness of the electrolyte 20 is considerably large in comparison with the thickness of the cathode 22 and the thickness of the anode 24. Densification treatment is applied to the outer circumferential surface of the anode 24 for preventing leakage of the fuel gas.

In the second embodiment, after consumption at the cathode 22, the second exhaust gas OGoff flows into the chamber 106 from the outer circumferential end surface of the cathode 22, and flows through the slits 100 of the annular portion 92 to the outside of the fuel cell 120. Further, after consumption at the anode 24, the first exhaust gas FGoff flows through a space between the seal portion 94 and the first plate 30 to the outside of the fuel cell 120.

Thus, the first exhaust gas FGoff does not enter the chamber 106. It is possible to prevent combustion of the first exhaust gas FGoff and the second exhaust gas OGoff as much as possible. Accordingly, the same advantages as in the case of the first embodiment can be achieved. For example, it is possible to improve the power generation efficiency and the durability of the electrolyte electrode assembly 26.

Figure 9:
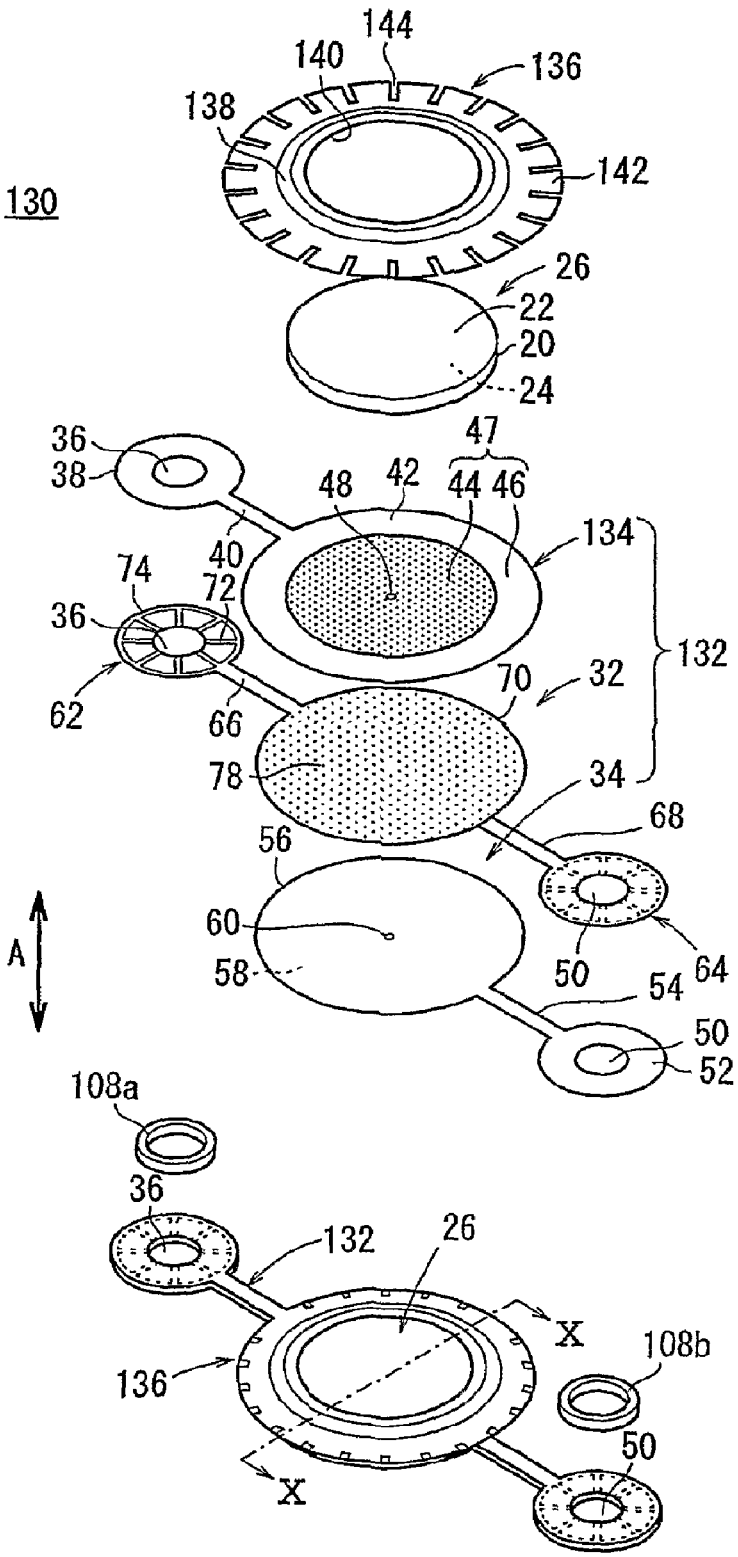
FIG. 9 is an exploded perspective view showing a fuel cell according to a third embodiment.
Figure 10:
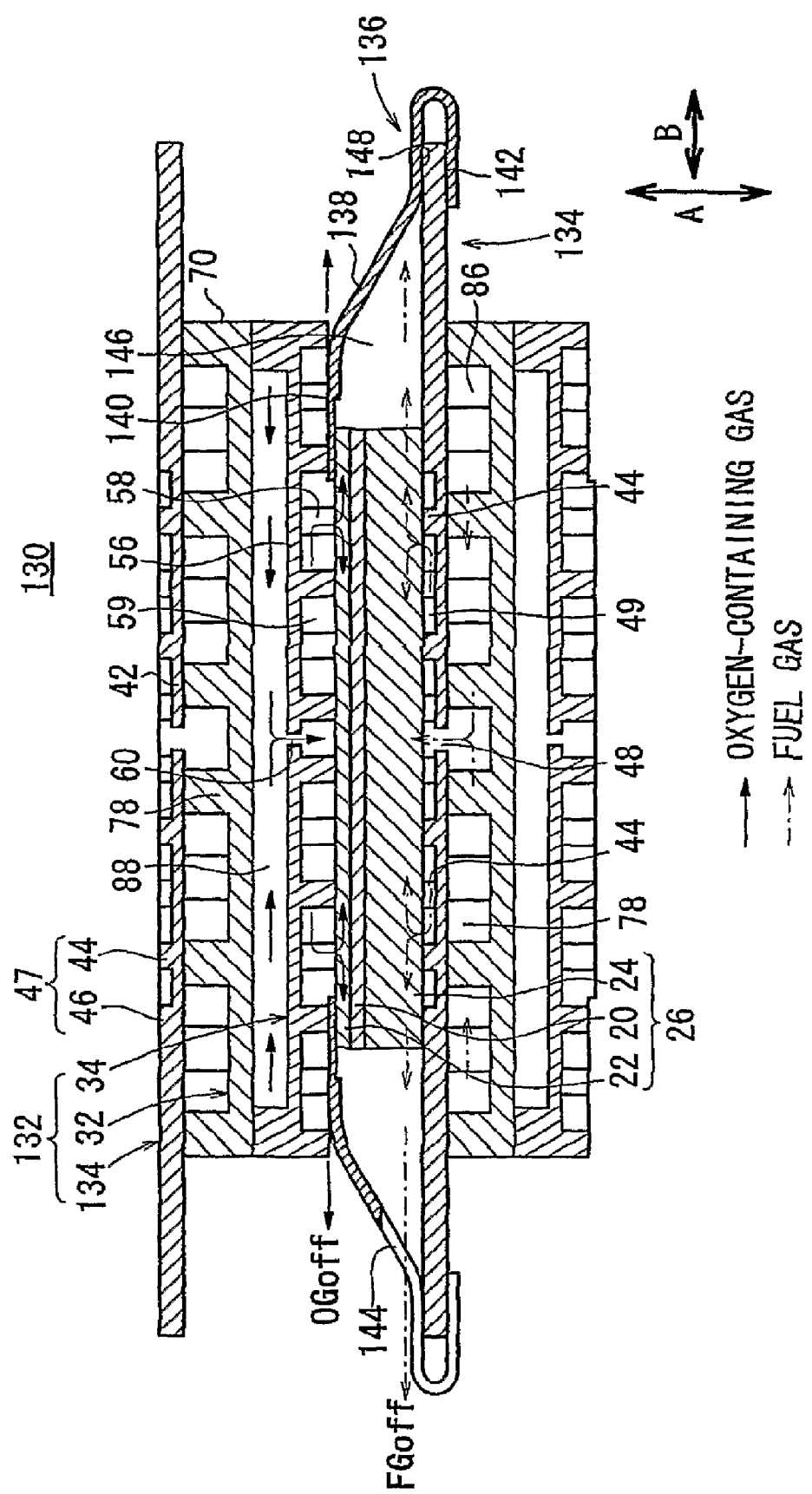
FIG. 10 is a cross-sectional view schematically showing operation of the fuel cell.

FIG. 9 is an exploded perspective view showing a fuel cell 130 according to a third embodiment of the present invention. FIG. 10 is a cross-sectional view schematically showing operation of the fuel cell 130. The fuel cell 130 is formed by sandwiching the electrolyte electrode assembly 26 between a pair of separators 132. The separator 132 includes first, second, and third plates 134, 32, 34. The diameter of the first plate 134 is larger than the diameter of the second plate 32 and the diameter of the third plate 34.

An exhaust gas separation member 136 is provided between a pair of the separators 132. The exhaust gas separation member 136 includes an annular portion 138, a thin seal portion 140, and a plurality of stoppers 142. The annular portion 138 is provided around the outer circumferential portion of the electrolyte electrode assembly 26. The thin seal portion 140 is provided continuously from the annular portion 138, on the inner side, and sandwiched between the outer end of the electrolyte electrode assembly 26 and one of the separators 132. The stoppers 142 are fixedly engaged with the other separator 132.

As shown in FIG. 9, the exhaust gas separation member 136 has the plate shaped stoppers 142 extending outwardly from the outer circumferential portion of the annular portion 138. Slits (openings) 144 are formed between the stoppers 142. The stoppers 142 are folded back, around the outer circumferential portion of the first plate 134 of the separator 132, and subjected to a crimping process such that the exhaust gas separation member 136 is fixedly engaged with the first plate 134 (FIG. 10).

The annular portion 138 forms an inclined circumferential surface between the seal portion 140 and the stoppers 142, and a chamber 146 is formed between the annular portion 138 and the outer circumferential portion of the electrolyte electrode assembly 26. The chamber 146 is open to the outside through the slits 144. Insulating coating (insulator) 148 is provided on any of the surfaces of the stopper 142 and the outer end of the first plate 134 that contact each other.

In the third embodiment, the same advantages as in the cases of the first and second embodiments can be obtained. Further, by subjecting the stoppers 142 to a crimping process such that the stoppers 142 are fixedly engaged with the outer end of the first plate 134, it is possible to reliably ensure that the stoppers 142 and the separator 132 tightly contact each other. Accordingly, further improvement in the sealing performance is achieved.

Figure 11:
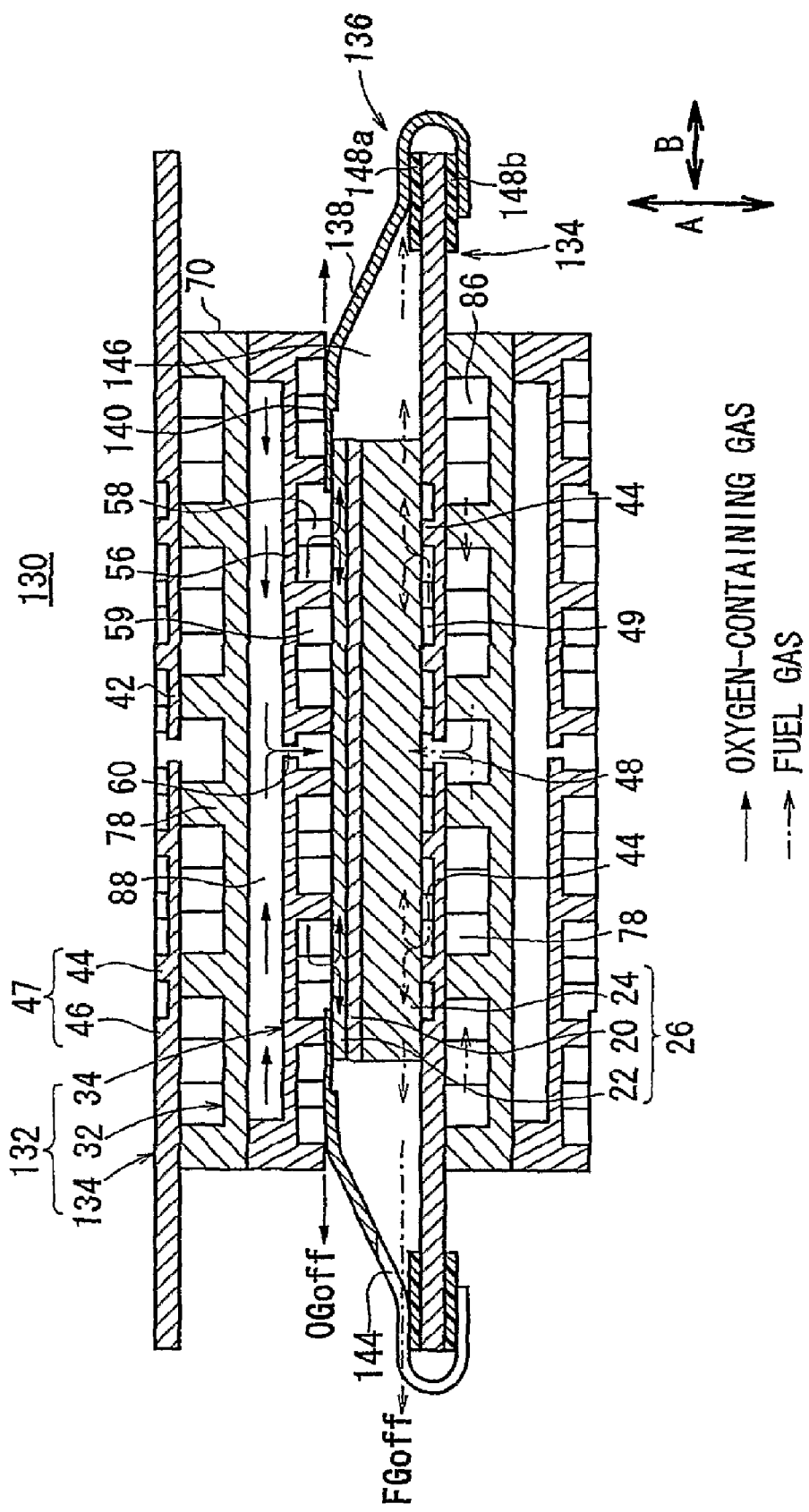
FIG. 11 is a cross-sectional view showing the fuel cell using a separate insulating ring.

Instead of providing the insulating coating 148 on the stoppers 142 or the outer end of the first plate 134, for example, as shown in FIG. 11, insulating rings (insulators) 148a, 148b made of mica material or the like is provided on both surfaces of the outer circumferential portion of the first plate 134, and the stoppers 142 are subjected to a crimping process.

Figure 12:
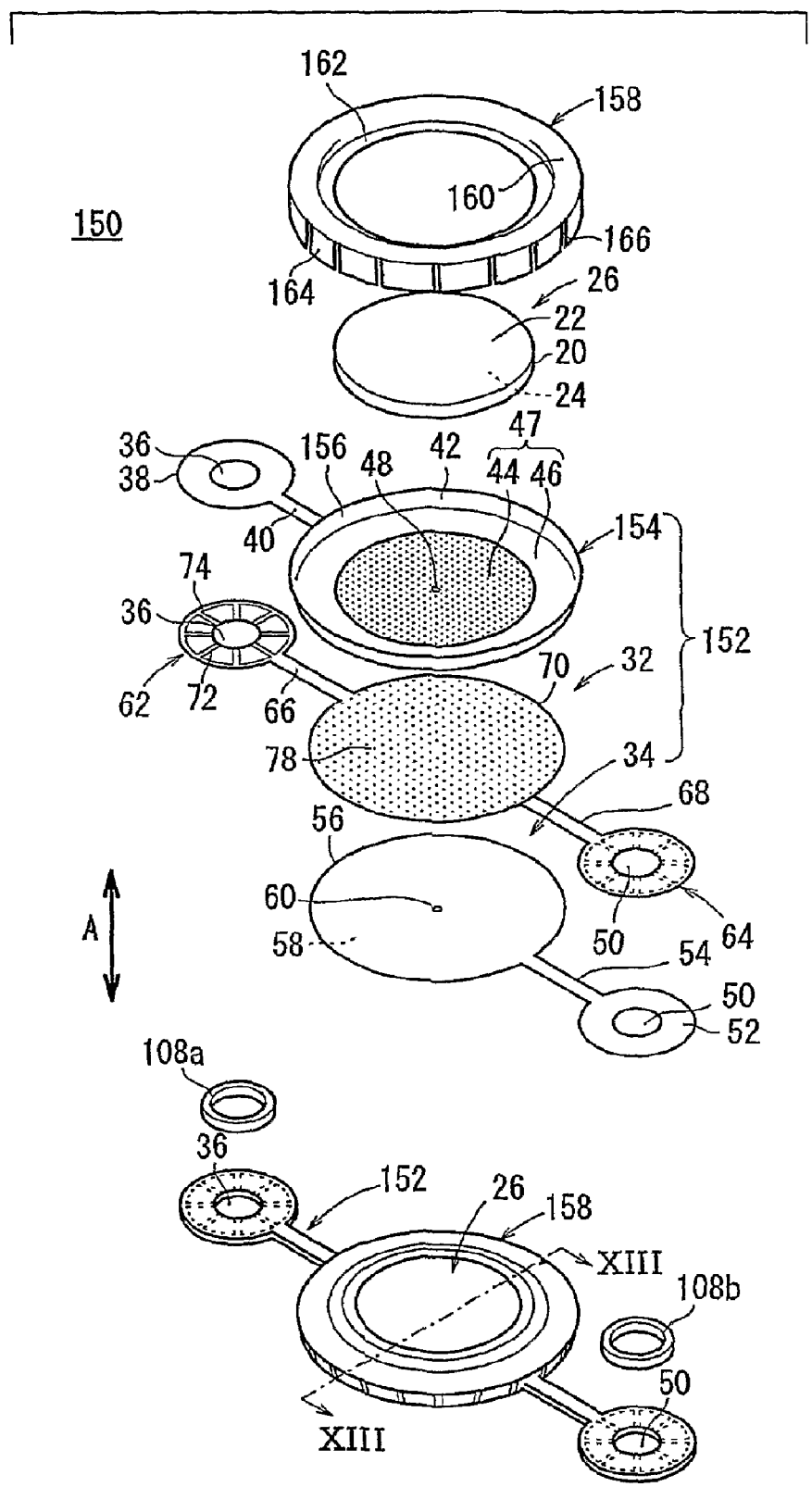
FIG. 12 is an exploded perspective view showing a fuel cell according to a fourth embodiment of the present invention.
Figure 13:
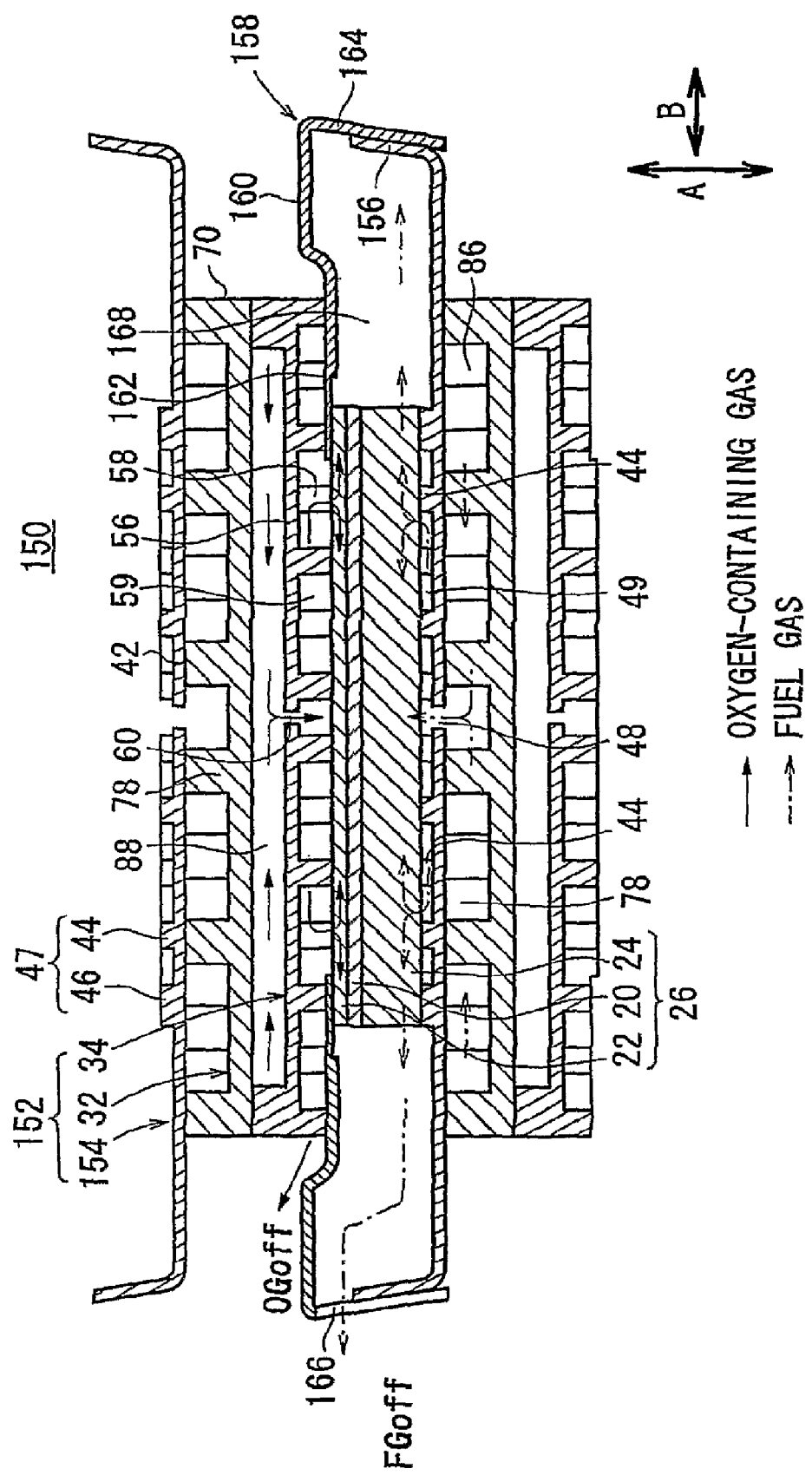
FIG. 13 is a cross-sectional view schematically showing operation of the fuel cell.

FIG. 12 is an exploded perspective view showing a fuel cell 150 according to a fourth embodiment of the present invention. FIG. 13 is a cross-sectional view schematically showing operation of the fuel cell 150.

The fuel cell 150 is formed by sandwiching the electrolyte electrode assembly 26 between a pair of separators 152. The separator 152 includes first, second, and third plates 154, 32, 34. The diameter of the first plate 154 is larger than the diameter of the second plate 32, and the diameter of the third plate 34. The first plate 154 has a curved end 156 curved in a direction away from the second plate 32.

An exhaust gas separation member 158 is provided between a pair of the separators 152. The exhaust gas separation member 158 includes an annular portion 160, a thin seal portion 162, and stoppers 164. The annular portion 160 is provided around the outer circumferential portion of the electrolyte electrode assembly 26. The seal portion 162 is provided on the inner side of the annular portion 160, and integral with the annular portion 160 through a step. The thin seal portion 162 is sandwiched between the outer end of the electrolyte electrode assembly 26 and one of the separators 152. The stoppers 164 are positioned on the outer circumferential side of the annular portion 160, and integral with the annular portion 160. The stoppers 164 are fixedly engaged with a curved end 156 of the first plate 154 of the other separator 152.

The stoppers 164 have taper structure, i.e. the stoppers 164 are inclined inwardly toward the first plate 154 for engagement. Further, a plurality of slits (openings) 166 are provided between the stoppers 164 at predetermined intervals. A chamber 168 is formed in the exhaust gas separation member 158. The chamber 168 is open to the outside through the slits 166.

In the fourth embodiment, as shown in FIG. 13, the exhaust gas separation member 158 is provided between the separators 152. The stoppers 164 of the exhaust gas separation member 158 and the curved end 156 of the first plate 154 of the separator 152 are overlapped with each other, and fixedly engaged in tapered configuration. Thus, the desired sealing performance is maintained and the thermal expansion difference between the stoppers 164 and the first plate 154 is absorbed by the mutual sliding movement. It is possible to reliably prevent deformation, damages or the like.

For example, insulating coating and insulating rings (not shown) are interposed between the overlapping surfaces of the stoppers 164 and the curved end 156 to prevent the short circuit between the anode 24 and the cathode 22.

Figure 14:
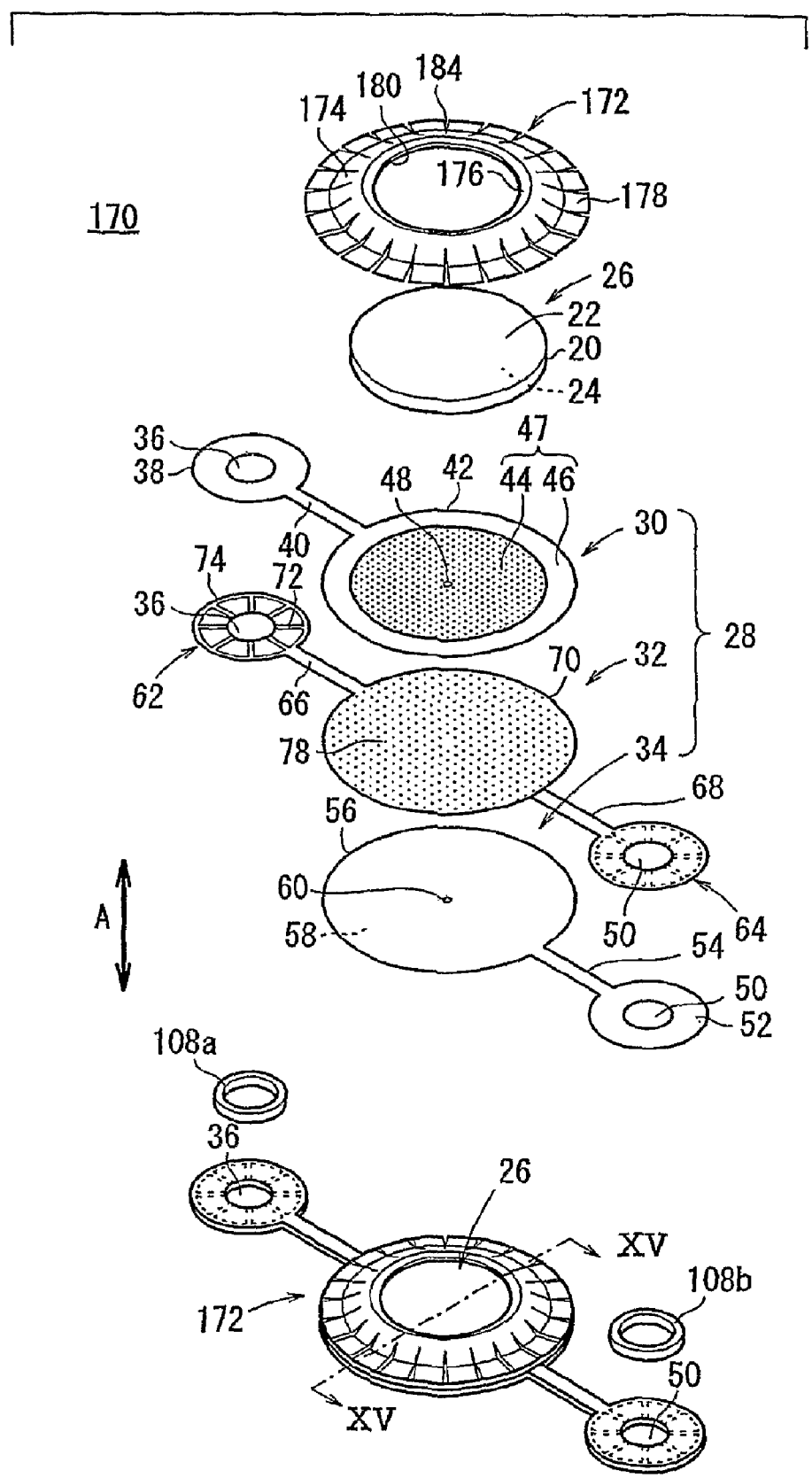
FIG. 14 is an exploded perspective view showing a fuel cell according to a fifth embodiment of the present invention.
Figure 15:
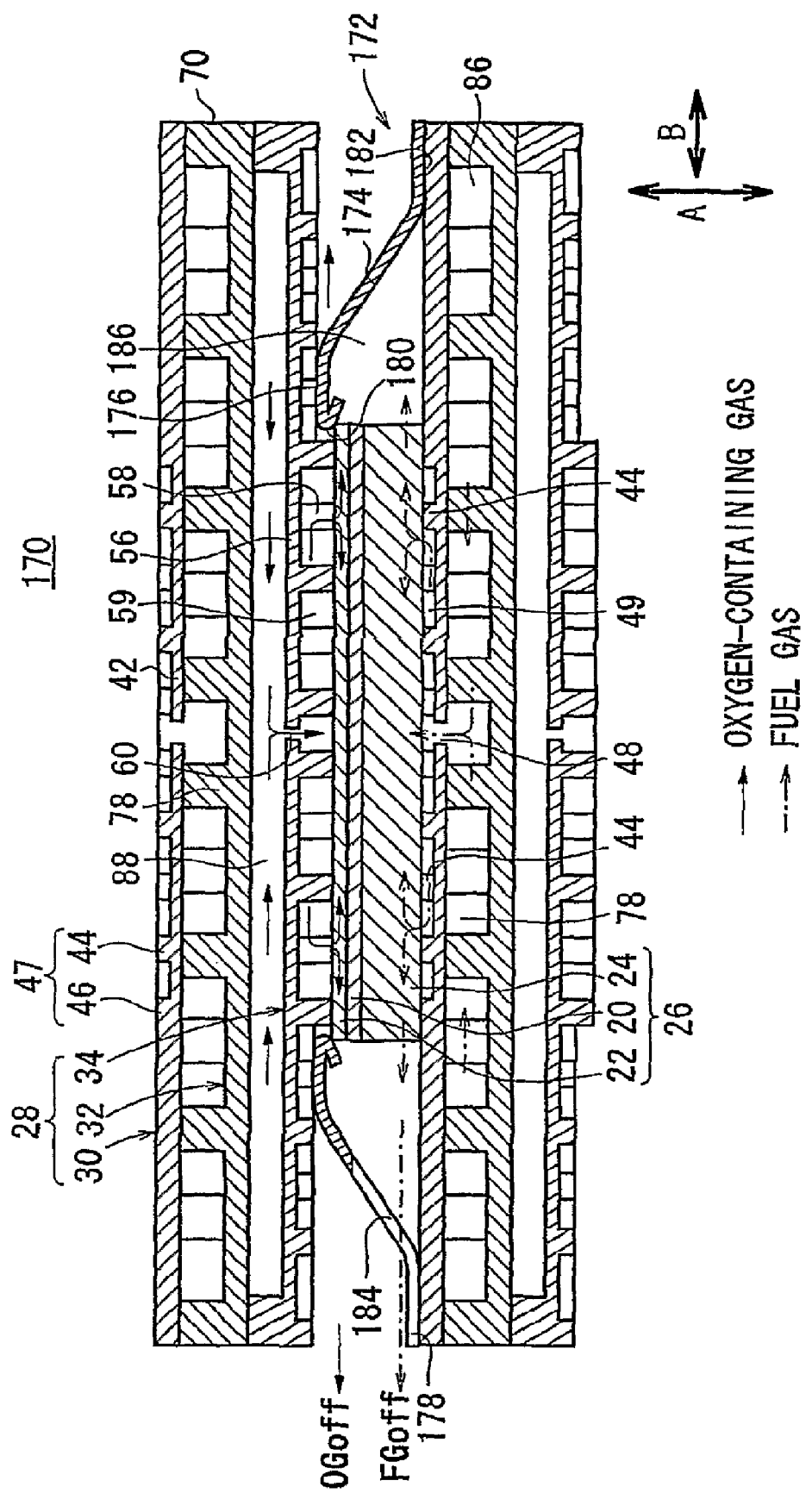
FIG. 15 is a cross-sectional view schematically showing operation of the fuel cell.

FIG. 14 is an exploded perspective view showing a fuel cell 170 according to a fifth embodiment of the present invention. FIG. 15 is a cross-sectional view schematically showing operation of the fuel cell 170.

The fuel cell 170 includes an exhaust gas separation member 172 provided between a pair of the separators 28. The exhaust gas separation member 172 includes an annular portion 174, a seal portion 176, and stoppers 178. The annular portion 174 is provided around the outer circumferential portion of the electrolyte electrode assembly 26. The seal portion 176 is formed integrally with the inner circumferential end of the annular portion 174. The seal portion 176 is sandwiched between the outer circumferential end of the electrolyte electrode assembly 26 and one of the separators 28. The stoppers 178 are formed integrally with the outer circumferential end of the annular portion 174, and fixedly engaged with the other separator 28.

The inner end of the seal portion 176 is folded, and the folded portion is sandwiched between the outer circumferential end of the electrolyte electrode assembly 26 and the third plate 34. Insulating coating 180 is provided in an area extending from the folded portion to the seal portion 176. Further, insulating coating or insulating ring (insulator) 182 is provided in an area where the stoppers 178 contact the outer end of the first plate 30. It is sufficient that at least one of the insulating coating 180 and the insulating coating 182 is provided. In the fifth embodiment, the inner end of the seal portion 176 is folded. Alternatively, instead of providing the folded portion, in a modified embodiment, the thickness of the inner end of the seal portion 176 is reduced, and the thin inner end of the seal portion 176 is sandwiched between the outer circumferential end of the electrolyte electrode assembly 26 and the third plate 34.

A plurality of slits 184 are formed between the stopper 178 and the chamber 186 formed in the exhaust gas separation member 172 is open to the outside through the slits 184.

In the fifth embodiment, the exhaust gas separation member 172 is provided as a single member. The seal portion 176 is tightly interposed between the outer end of the electrolyte electrode assembly 26 and the separator 28. By elastic deformation of the annular portion 174, the stoppers 178 tightly contact the separator 28. Thus, in the fifth embodiment, the same advantages as in the case of the first to fourth embodiments can be obtained.

Figure 16:
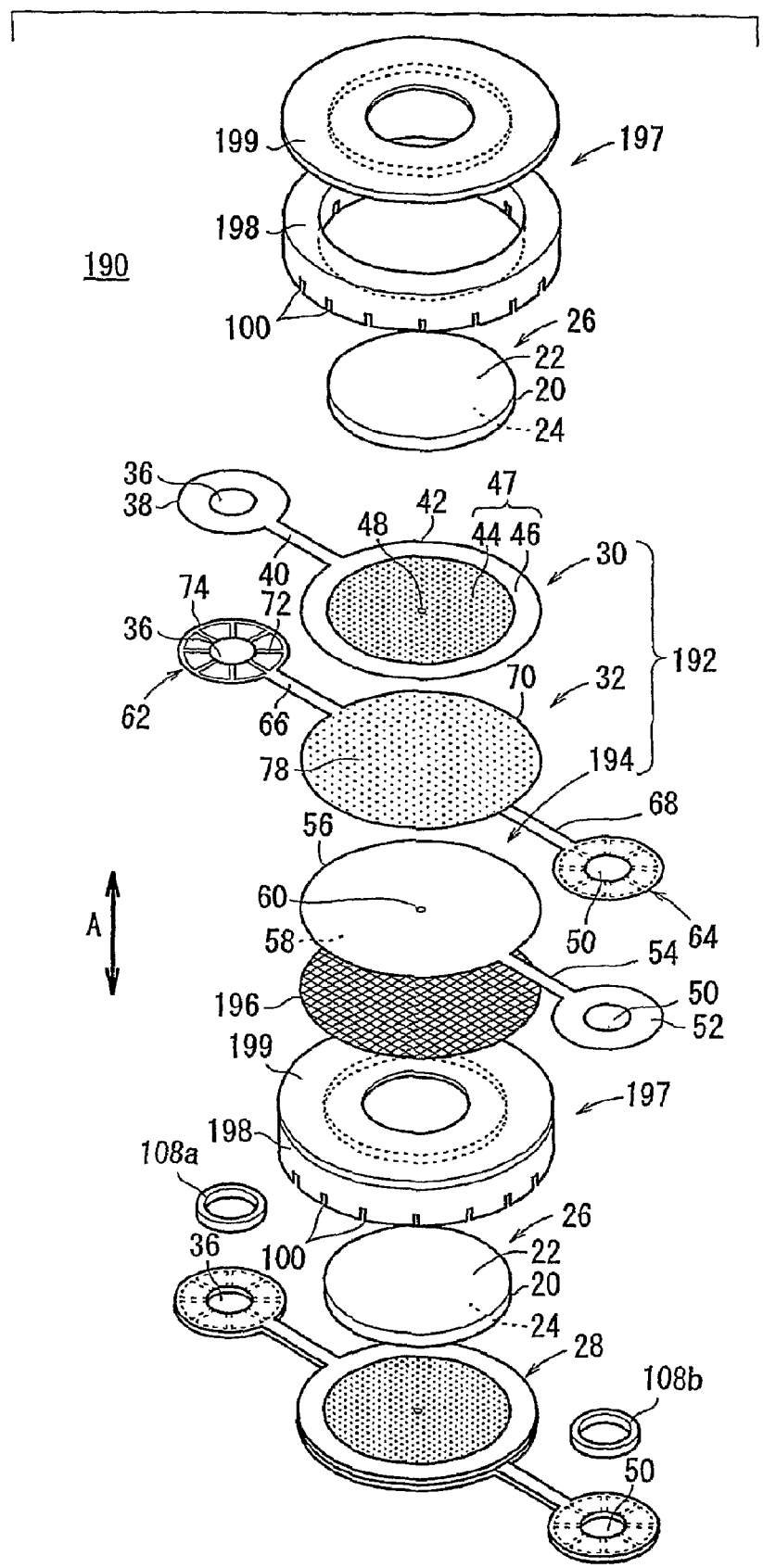
FIG. 16 is an exploded perspective view showing a fuel cell according to a sixth embodiment of the present invention.
Figure 17:
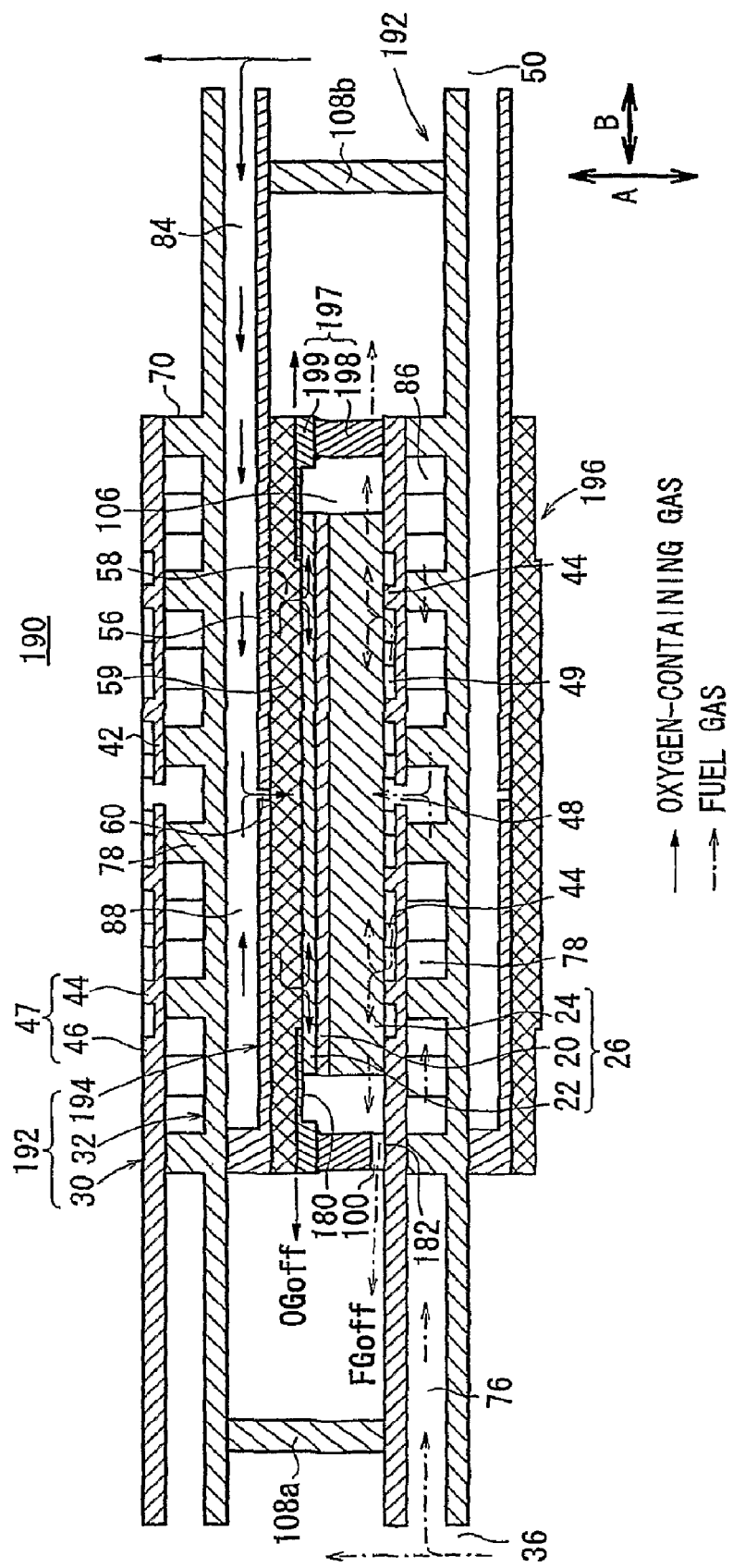
FIG. 17 is a cross-sectional view schematically showing operation of the fuel cell.

FIG. 16 is an exploded perspective view showing a fuel cell 190 according to a sixth embodiment of the present invention. FIG. 17 is a cross-sectional view schematically showing operation of the fuel cell 190.

The fuel cell 190 is formed by sandwiching the electrolyte electrode assembly 26 between a pair of separators 192. The separator 192 includes first, second and third plates 30, 32, 194. The third plate 194 has an electrically conductive mesh member 196 on a surface facing the cathode 22. For example, the mesh member 196 is made of wire rod of stainless steel (SUS material) or the like, and has a circular shape. In the sixth embodiment, the mesh member 196 is used. Instead of using the mesh member 196, it is also possible to use an electrically conductive felt member (not shown).

The thickness of the mesh member 196 is determined such that the mesh member 196 is deformed desirably when a load in the stacking direction is applied to the mesh member 196. The mesh member 196 directly contacts the surface of the second circular disk 56 and the oxygen-containing gas channel 59 is formed in the mesh member 196.

An exhaust gas separation member 197 is provided between the separators 192. The exhaust gas separation member 197 is formed by combining an annular member 198 and a seal member 199 as separate pieces of members, and welding or joining the combination sections of the annular member 198 and the seal member 199 into one piece. In this case, though the annular member 198 has high rigidity, the load in the stacking direction is absorbed by the elastic mesh member 196. Further, since the seal member 199 has elasticity like a spring, the exhaust gas separation member 197 itself functions as an elastic member, and the partial (linear) contact at the time of tightening is prevented.

As in the case of the fifth embodiment, the inner end of the seal member 199 is thin, and insulating coating 180 is provided in an area extending from the inner end. The insulating coating or insulating ring (insulator) 182 is provided in an area where the annular member 198 contacts the outer end of the first plate 30. It is sufficient that only at least one of the insulating coating 180 and the insulating coating 182 is provided. Further, instead of the exhaust gas separation member 197, any of the exhaust gas separation members 90, 136, 158, 172 can be adopted.

In the sixth embodiment, the exhaust gas separation member 197 having the seal member 199 with the thin inner end is adopted. Alternatively, an exhaust separation member (not shown) having a seal member (not shown) that is thin in its entirety, not only the inner end can be adopted. Also in seventh and eighth embodiments as described later, it is possible to use the seal member that is thin in its entirety.

In the sixth embodiment, as shown in FIG. 17, the oxygen-containing gas supplied to the oxygen-containing gas channel 59 formed in the mesh member 196 is consumed in the reaction, and then, the oxygen-containing gas after consumption is discharged to the outside of the fuel cell 190 through the mesh member 196. At this time, the seal member 199 is provided as a shield between the mesh member 196 and the chamber 106. Therefore, the second exhaust gas OGoff does not flow into the chamber 106. Thus, combustion in the chamber 106 is prevented suitably. As a result, the same advantages as in the cases of the first to fifth embodiments can be obtained.

Figure 18:
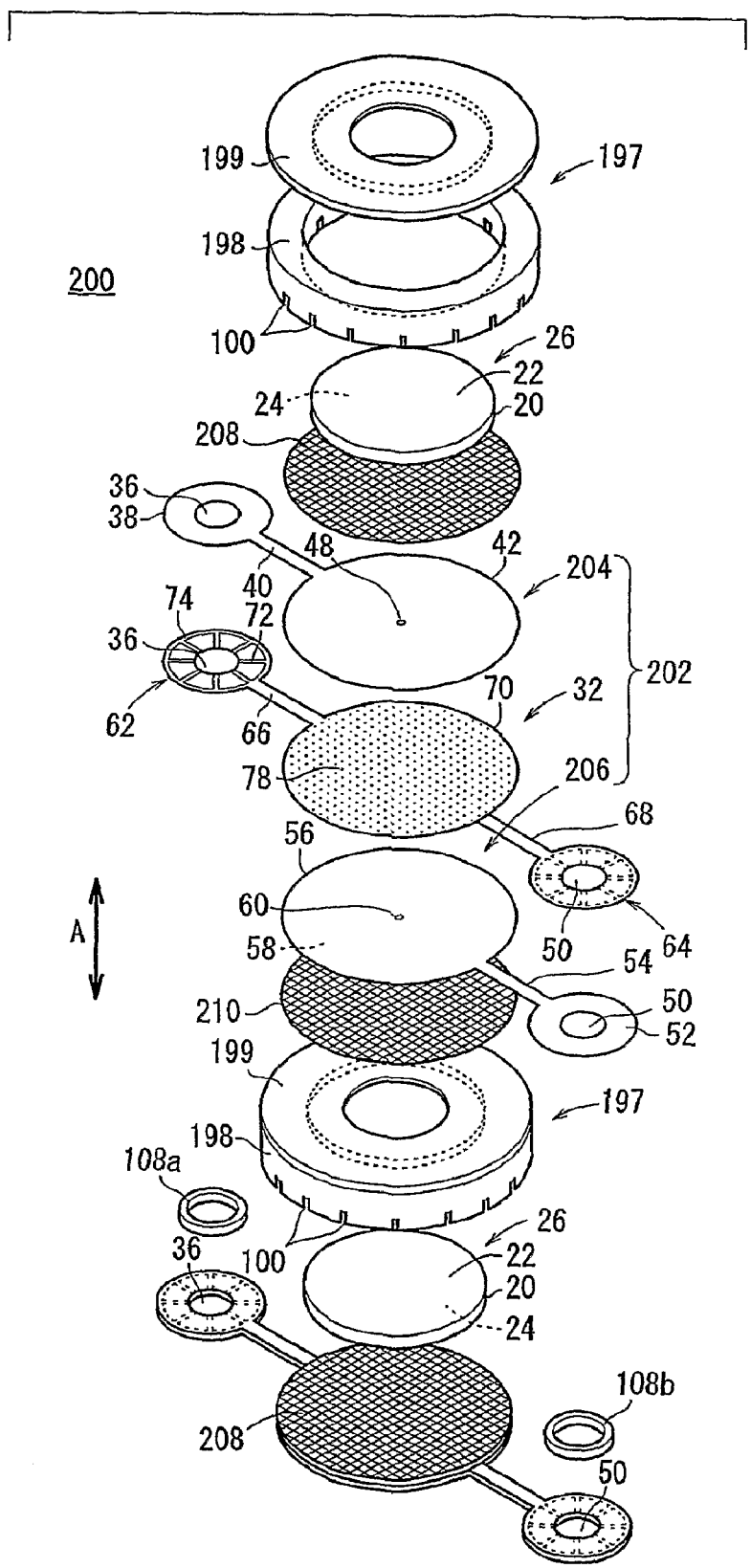
FIG. 18 is an exploded perspective view showing a fuel cell according to a seventh embodiment of the present invention.
Figure 19:
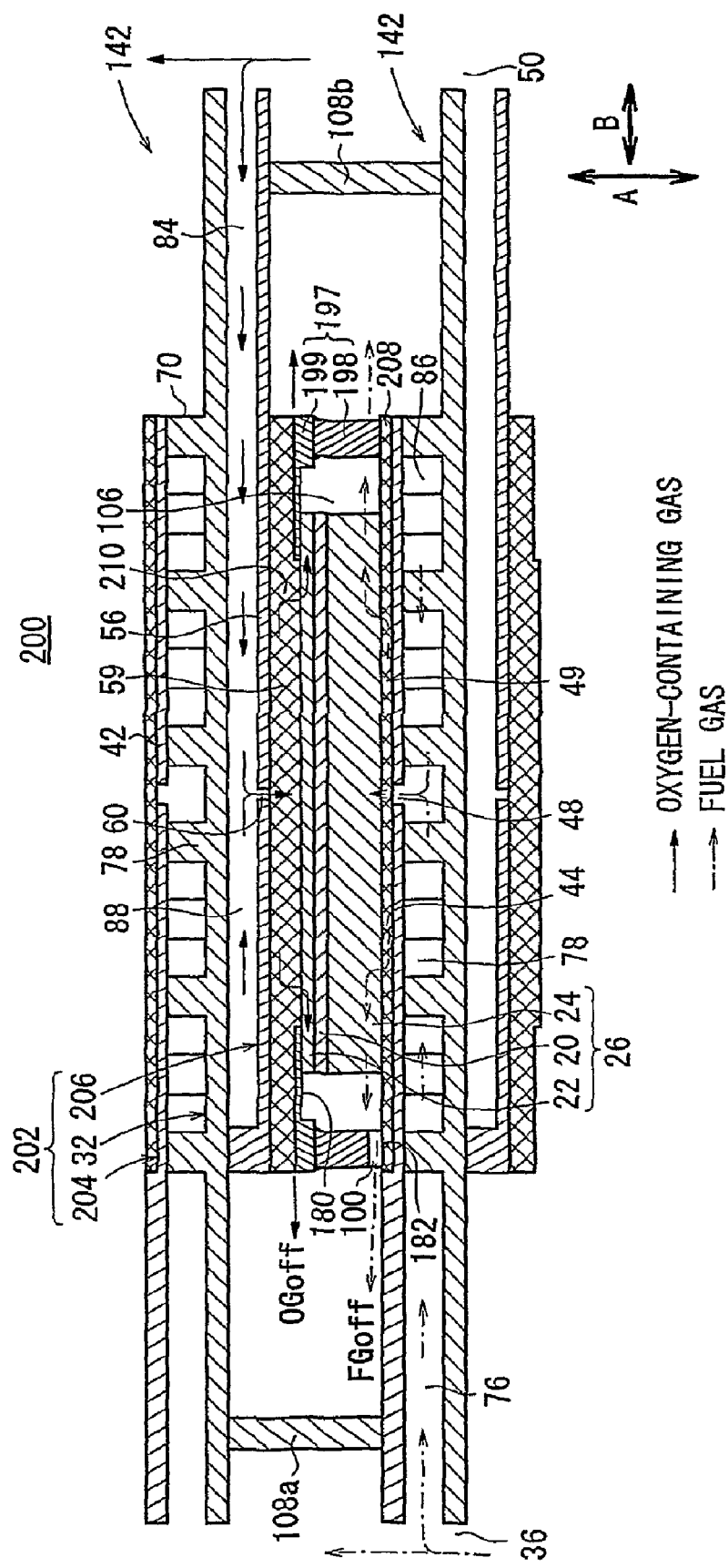
FIG. 19 is a cross-sectional view schematically showing operation of the fuel cell.

FIG. 18 is an exploded perspective view showing a fuel cell 200 according to a seventh embodiment of the present invention. FIG. 19 is a cross-sectional view schematically showing operation of the fuel cell 200.

The fuel cell 200 is formed by sandwiching the electrolyte electrode assembly 26 between a pair of separators 202. The separator 202 includes first, second, and third plates 204, 32, 206. A first mesh member 208 is provided on a surface of the first plate 204 facing the anode 24, and a second mesh member 210 is provided on a surface of the third plate 206 facing the cathode 22.

Each of the first and second mesh members 208, 210 has a circular disk shape, and made of a wire rod material of stainless steel (SUS material) or the like. An exhaust gas separation member 197 is interposed between the separators 202.

In the seventh embodiment, after consumption at the anode 24, the fuel gas flows as the first exhaust gas FGoff from the first mesh member 208 to the chamber 106, and then, the fuel gas flows through the slits 100 of the annular member 198, and is discharged to the outside of the fuel cell 200. After consumption at the cathode 22, the oxygen-containing gas flows as the second exhaust gas OGoff through the second mesh member 210, and is discharged to the outside of the fuel cell 200. At this time, leakage of the second exhaust gas OGoff to the chamber 106 is prevented by the seal member 199. Thus, combustion in the chamber 106 is prevented as much as possible.

Figure 20:
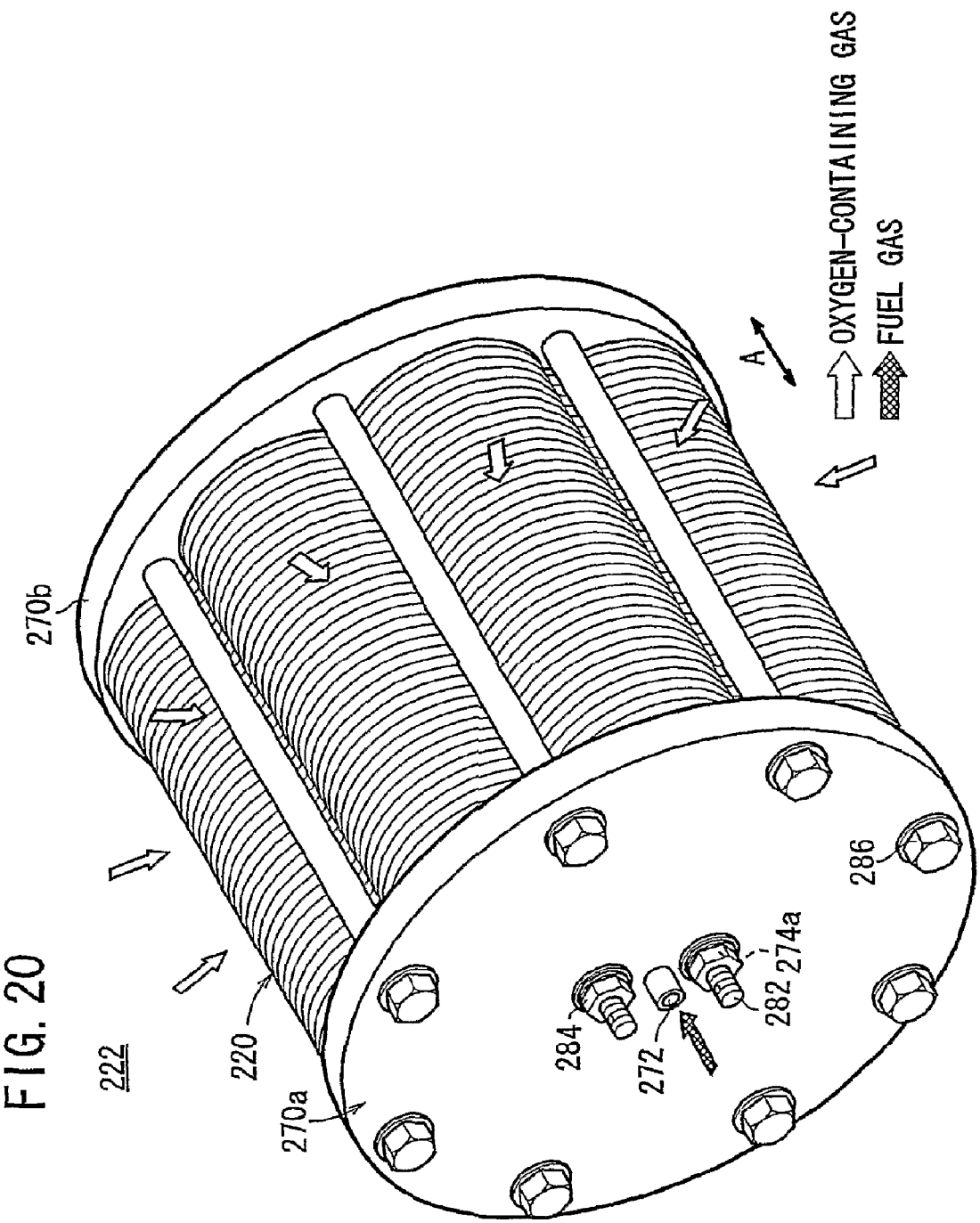
FIG. 20 is a perspective view schematically showing a fuel cell stack formed by stacking fuel cells according to an eighth embodiment of the present invention.

FIG. 20 is a perspective view showing a fuel cell stack 222 formed by stacking a plurality of fuel cells 220 according to an eighth embodiment of the present invention.

Figure 21:
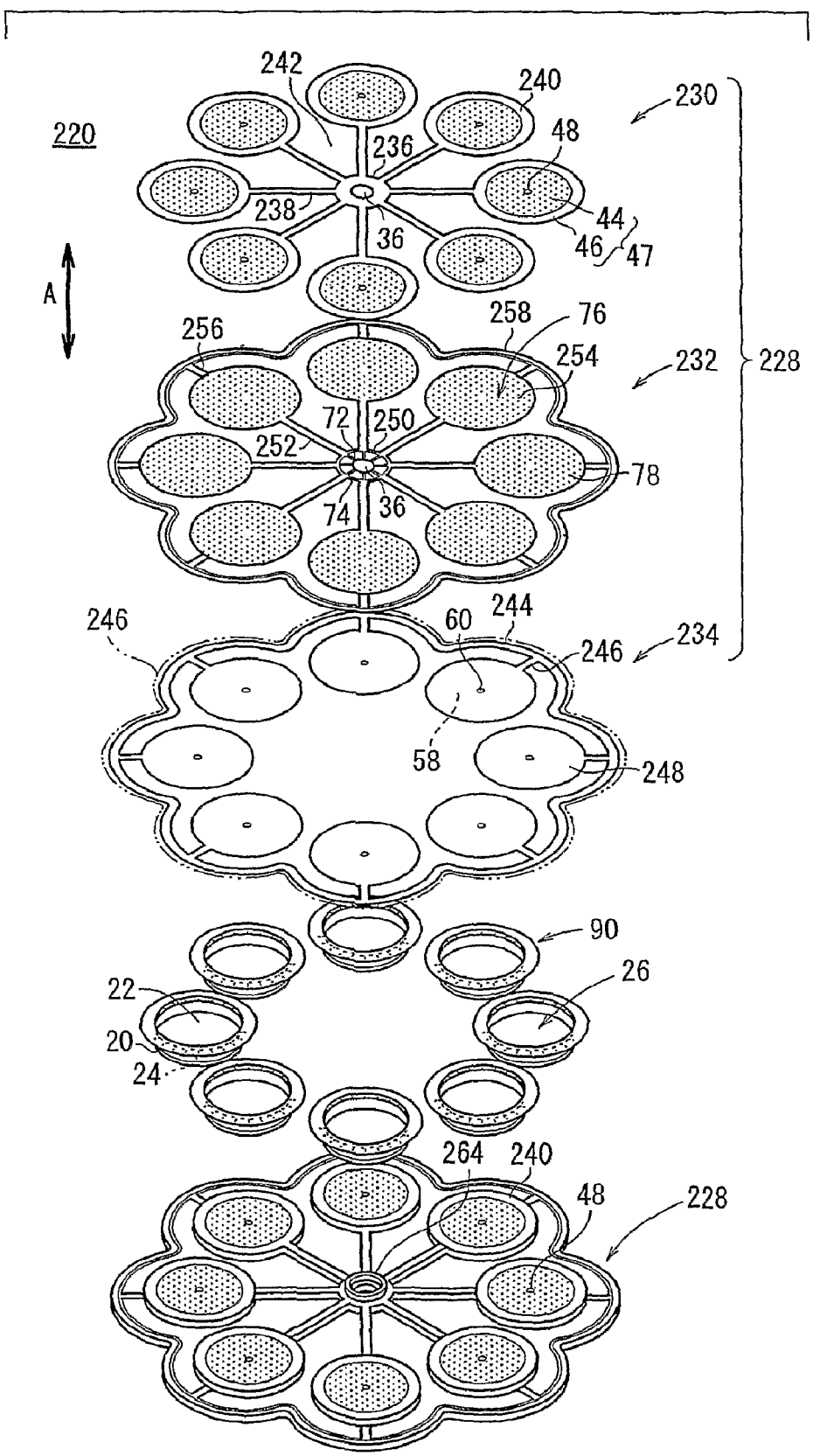
FIG. 21 is an exploded perspective view showing a separator of the fuel cell.
Figure 22:
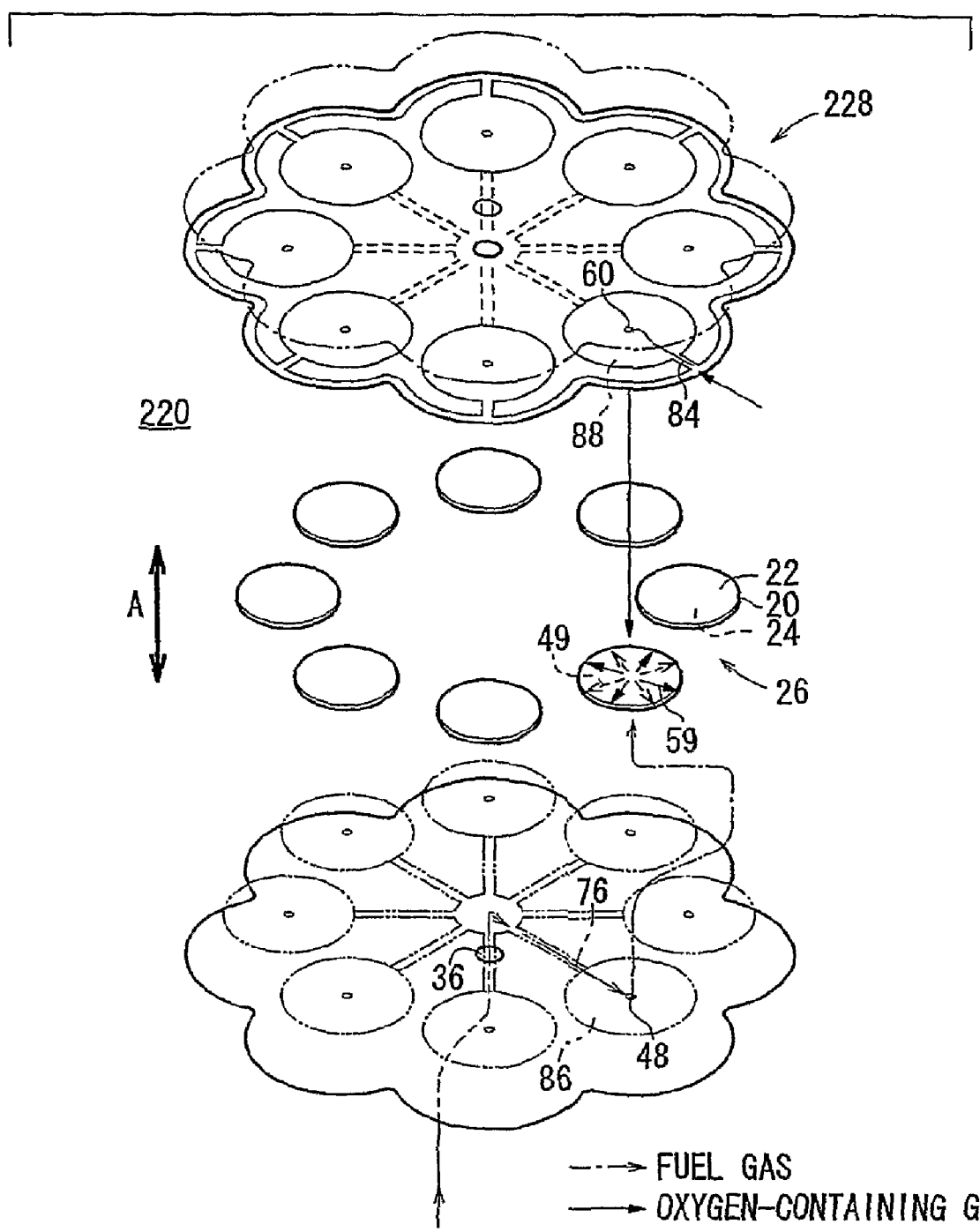
FIG. 22 is a partial exploded perspective view showing gas flows in the fuel cell.

As shown in FIGS. 21 and 22, the fuel cell 220 is formed by sandwiching a plurality of, e.g., eight electrolyte electrode assemblies 26 between a pair of separators 228. The eight electrolyte electrode assemblies 26 are arranged along a virtual circle concentric with a fuel gas supply passage 36 extending through the center of the separators 228.

The separator 228 includes first, second, and third plates 230, 232, 234 that are stacked together. For example, the first to third plates 230, 232, 234 are metal plates of, e.g., stainless alloy.

The first plate 230 has a first small diameter end portion 236. A fuel gas supply passage 36 extends through the center of the first small diameter end portion 236. Further, the first plate 230 includes first circular disks 240 each having a relatively large diameter. The first small diameter end portion 236 is integral with the first circular disks 240 through a plurality of bridges 238. The bridges 238 extend radially outwardly from the first small diameter end portion 236 at equal intervals (angles). Further, an exhaust gas channel 242 is formed in the area around, and internal from the first circular disks 240.

Each of the first circular disks 240 has first protrusions 47 on a surface which contacts the anode 24 of the electrolyte electrode assembly 26. The first protrusions include a plurality of protrusions 44 and a ring shaped protrusion 46. A fuel gas inlet 48 is formed at the center of the first circular disk 240. The fuel gas inlet 48 is connected to the fuel gas channel 49.

The third plate 234 has a curved outer section 244. Respective circular arc portions of the curved outer section 244 are integral with second circular disks 248 each having a relatively large diameter through bridges 246 extending internally from the circular arc portions. As in the case of the first circular disks 240 of the first plate 230, eight second circular disks 248 are arranged at equal intervals (angles). Each of the second circular disks 248 has a plurality of second protrusions 58 on a surface which contacts the cathode 22 of the electrolyte electrode assembly 26. An oxygen-containing gas inlet 60 is formed at the center in each of the second circular disks 248. The oxygen-containing gas inlet 60 is connected to the oxygen-containing gas channel 59.

The second plate 232 has a second small diameter end portion 250. The fuel gas supply passage 36 extends through the center of the second small diameter end portion 250. Eight bridges 252 extend radially from the second small diameter end portion 250. Front ends of the bridges 252 are integral with third circular disks 254 each having a relatively large diameter. The third circular disks 254 are connected to bridges 256 along extension lines of the bridges 252. All of the bridges 256 are integral with the curved outer section 258.

A plurality of third protrusions 78 are formed in the entire surface of the third circular disk 254 facing the first plate 230. Slits 72 and a recess 74 are formed in the second small diameter end portion 250. Part of the fuel gas supply channel 76 is formed in the bridges 252.

Figure 23:
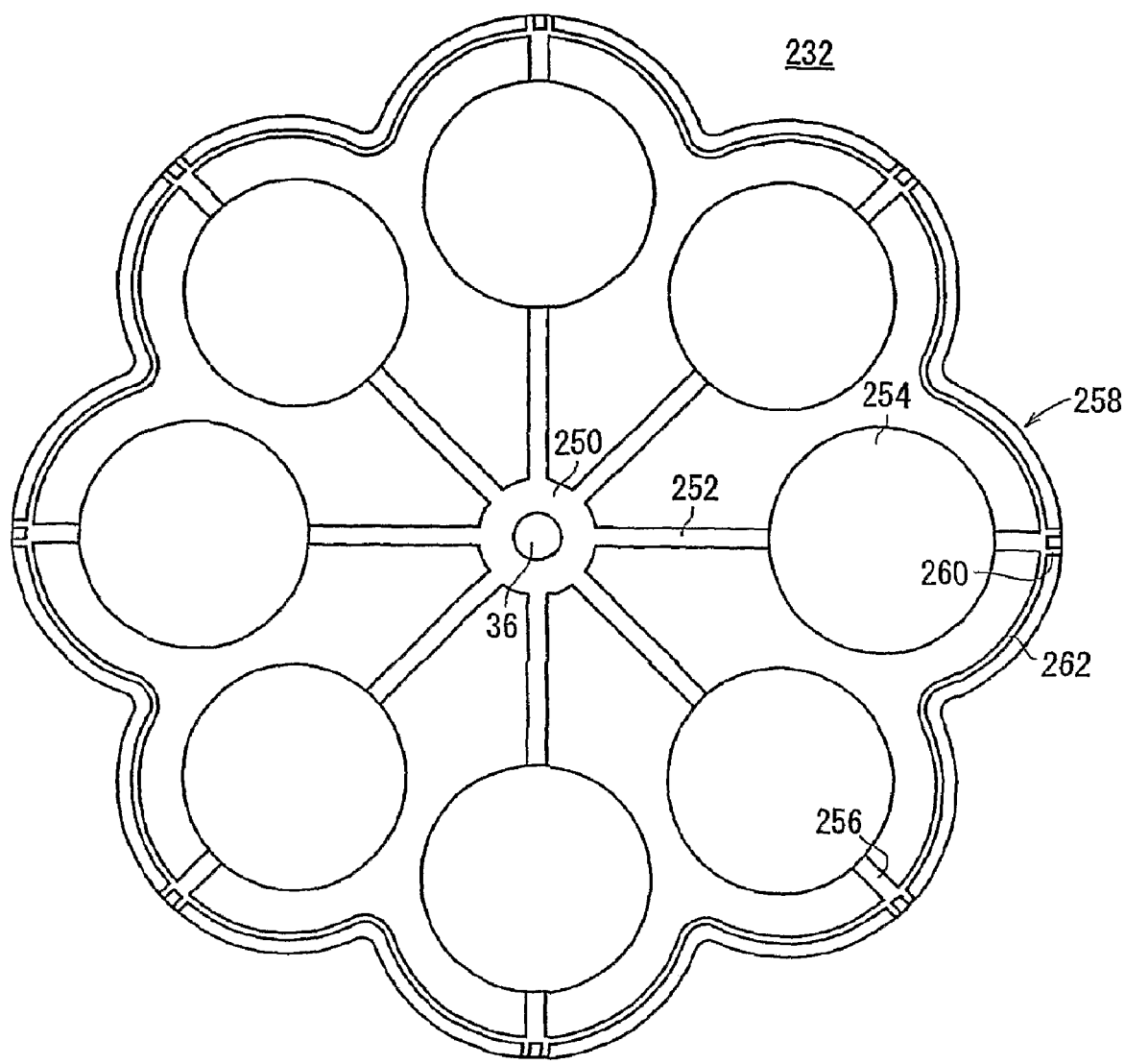
FIG. 23 is a view showing one surface of a second plate of the separator.

As shown in FIG. 23, the curved outer section 258 of the second plate 232 has a plurality of slits 260 as air intake passages at positions corresponding to the respective third circular disks 254, on a surface facing the third plate 234.

Further, a recess 262 for preventing the flow of brazing material is formed along the profile of the curved outer section 258.

When the bridge 238 of the first plate 230 and the bridge 252 of the second plate 232 are joined together by brazing to form a fuel gas channel member, part of the fuel gas supply channel 76 is formed in the fuel gas channel member. Further, the fuel gas supply channel 76 includes a fuel gas pressure chamber 86 between the first circular disk 240 and the third circular disk 254.

When the bridge 256 of the second plate 232 and the bridge 246 of the third plate 234 are joined together by brazing to form an oxygen-containing gas channel member, part of the oxygen-containing gas supply channel 84 is formed in the oxygen-containing gas channel member. Further, the oxygen-containing gas supply channel 84 includes an oxygen-containing gas pressure chamber 88 between the second circular disk 248 and the third circular disk 254.

An exhaust gas separation member 90 and an insulating seal 264 for sealing the fuel gas supply passage 36 are provided between the separators 228. An insulating seal 266 is provided between the curved outer sections 244, 258. For example, the insulating seals 264, 266 are made of mica material, or ceramic material.

As shown in FIG. 20, the fuel cell stack 222 includes a plurality of fuel cells 220 stacked together, and end plates 270a, 270b provided at opposite ends in the stacking direction. The end plate 270a is insulated and a fuel gas supply port 272 is formed at the center of the end plate 270a. The fuel gas supply port 272 is connected to the fuel gas supply passage 36 in each of the fuel cells 220. Components between the end plates 270a, 270b are tightened together in the stacking direction using bolts 286.

Next, operation of the fuel cell stack 222 will be described below.

As shown in FIG. 21, in assembling the fuel cell 220, firstly, the first plate 230 and the third plate 234 are joined to both surfaces of the second plate 232 of the separator 228, e.g., by brazing. Further, the ring shaped insulating seal 264 is provided on the first plate 230 or the third plate 234 around the fuel gas supply passage 36. Further, the curved insulating seal 266 is provided on the curved outer section 258 of the second plate 232 or the curved outer section 244 of the third plate 234.

Figure 24:
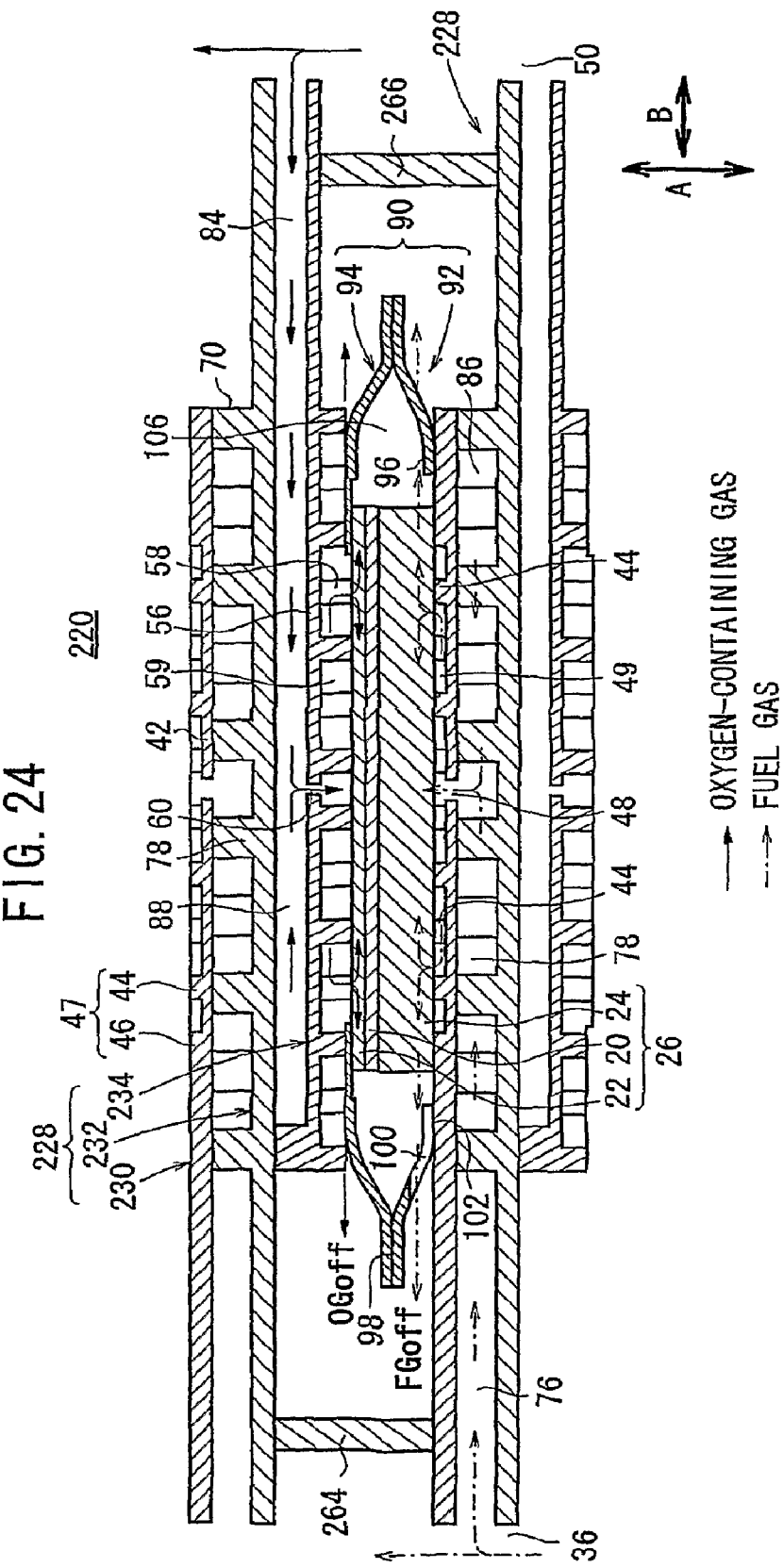
FIG. 24 is a cross-sectional view schematically showing operation of the fuel cell.
Figure 25:
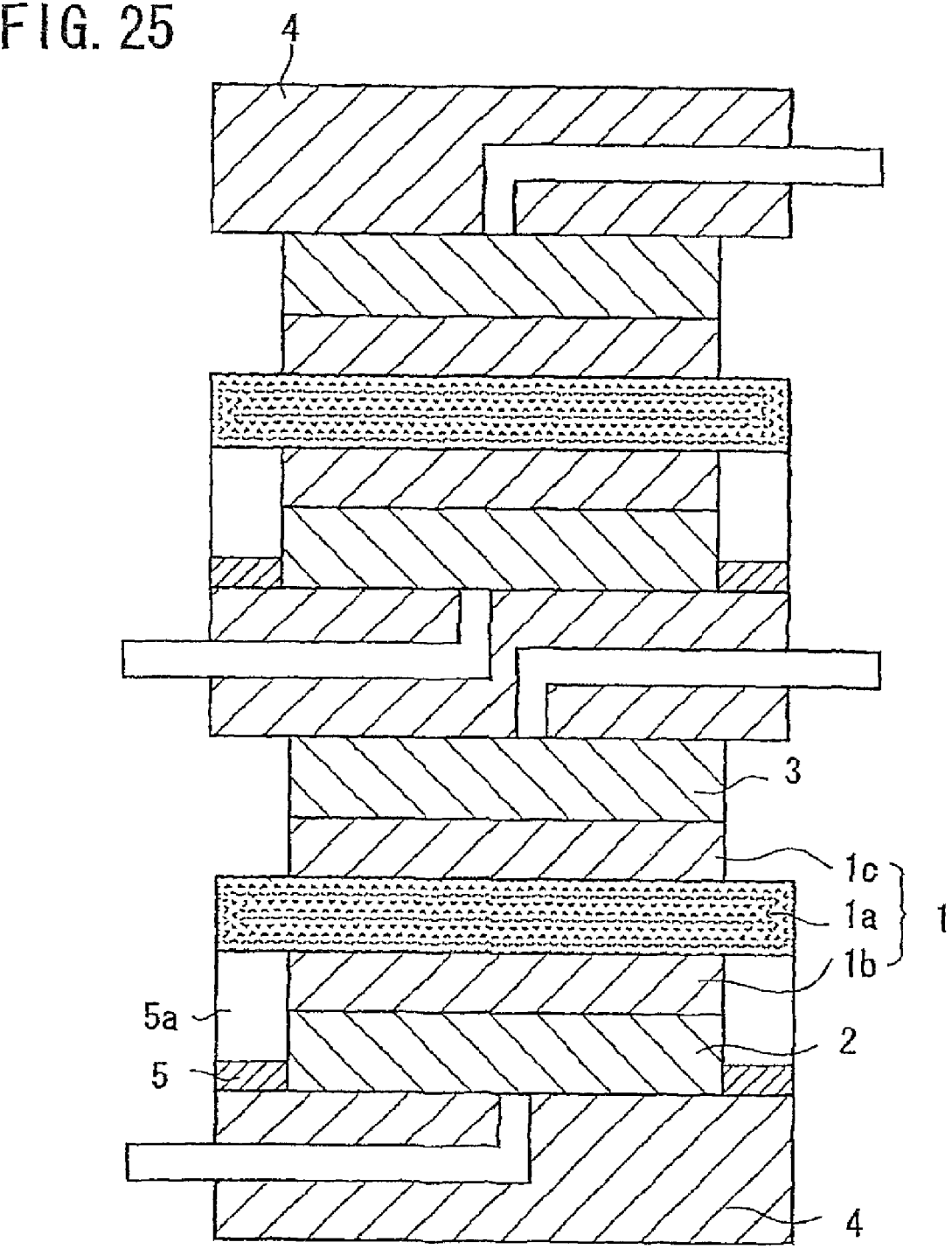
FIG. 25 is a cross-sectional view showing a conventional solid oxide fuel cell.

In this manner, the separator 228 is fabricated. As shown in FIG. 24, the second plate 232 divides a space between the first and third plates 230, 234 to form the fuel gas supply channel 76 and the oxygen-containing gas supply channel 84. Further, the fuel gas supply channel 76 is connected to the fuel gas supply passage 36, and the oxygen-containing gas supply channel 84 is open to the outside through the slits 260. Thus, the oxygen-containing gas is supplied from the outside of the fuel cell stack 222.

Then, the eight electrolyte electrode assembles 26 are sandwiched between the separators 228. As shown in FIG. 21, the electrolyte electrode assemblies 26 are placed between the separators 228, i.e., between the first circular disks 240 of one separator 228 and the second circular disks 248 of the other separator 228. The fuel gas inlet 48 is positioned at the center in each of the anodes 24, and the oxygen-containing gas inlet 60 is positioned at the center in each of the cathodes 22. The exhaust gas separation member 90 is provided between the separators 228.

The fuel cells 220 as assembled above are stacked in the direction indicated by the arrow A, and tightened together between the end plates 270a, 270b to form the fuel cell stack 222 (see FIG. 20).

When the fuel gas is supplied to the fuel gas supply passage 36 of the fuel cell stack 222, the fuel gas flows in the stacking direction indicated by the arrow A, and flows into the fuel gas supply channel 76 of the separators 228 of each fuel cell 220 (see FIG. 24).

When the fuel gas is supplied to the fuel gas pressure chamber 86 of the fuel gas supply channel 76, the fuel gas flows into the narrow fuel gas inlet 48, and the internal pressure of the fuel gas in the fuel gas pressure chamber 86 is increased. Thus, the fuel gas is supplied from the fuel gas inlet 48 to the fuel gas channel 49. The fuel gas flows inside the fuel gas channel 49 from the central region to the outer circumferential region of the anode 24.

The oxygen-containing gas is supplied into the outer circumferential side of each fuel cell 220. The oxygen-containing gas is supplied to the oxygen-containing gas supply channel 84 through the slits 260 formed in the outer circumferential portion of each separator 228. The oxygen-containing gas supplied to the oxygen-containing gas supply channel 84 flows into the narrow oxygen-containing gas inlet 60, and the internal pressure of the oxygen-containing gas in the oxygen-containing gas pressure chamber 88 is increased. Thus, the oxygen-containing gas is supplied from the oxygen-containing gas inlet 60 to the oxygen-containing gas channel 59. The oxygen-containing gas flows inside the oxygen-containing gas channel 59 from the central region to the outer circumferential region of the cathode 22.

Thus, in the electrolyte electrode assembly 26, the fuel gas flows from the central region to the outer circumferential region of the anode 24, and the oxygen-containing gas flows from the central region to the outer circumferential region of the cathode 22 (see FIG. 24). At this time, oxygen ions flow through the electrolyte 20 toward the anode 24 for generating electricity by electrochemical reactions.

In the eighth embodiment, the same advantages as in the cases of the first to seventh embodiments can be obtained.

The invention claimed is:

1. A fuel cell formed by stacking an electrolyte electrode assembly and separators, said electrolyte electrode assembly including an anode a cathode and an electrolyte interposed between said anode and said cathode, said fuel cell comprising:
   an exhaust gas separation member provided between said separators, wherein said exhaust gas separation member comprises:
   an annular portion formed around an outer circumferential portion of said electrolyte electrode assembly, and having an opening for discharging a first exhaust gas which has been consumed at one electrode of said anode and said cathode to an outside of said electrolyte electrode assembly; and
   a seal portion provided at an end of said annular portion for preventing the first exhaust gas from entering another electrode of said anode and said cathode.

2. A fuel cell according to claim 1, wherein said exhaust gas separation member has elastic properties by combination of said annular portion and said seal portion.

3. A fuel cell formed by stacking an electrolyte electrode assembly and separators, said electrolyte electrode assembly including an anode a cathode, and an electrolyte interposed between said anode and said cathode, said fuel cell comprising:
- an exhaust gas separation member provided between said separators, wherein said exhaust gas separation member comprises:
- an annular portion formed around an outer circumferential portion of said electrolyte electrode assembly, and having an opening for discharging a first exhaust gas which has been consumed at one electrode of said anode and said cathode to an outside of said electrolyte electrode assembly;
- a seal portion fixed to said annular portion for preventing the first exhaust gas from entering another electrode of said anode and said cathode; and
- a stopper provided at an end of said annular portion for allowing said exhaust gas separation member to be fixedly engaged with said separator adjacent to the one electrode.

4. A fuel cell according to claim 3, wherein said annular portion is made of material having high rigidity in comparison with material of said seal portion.

5. A fuel cell according to claim 3, wherein an insulator interposed between said stopper and said separator.

6. A fuel cell according to claim 3, wherein said exhaust gas separation member has elastic properties by combination of said annular portion, said seal portion, and the stopper.

7. A fuel cell according to claim 3, wherein densification treatment is applied to an outer circumferential surface of the other electrode for preventing leakage of a second exhaust gas which has been consumed at the other electrode.

8. A fuel cell according to claim 3, wherein said separator comprises:
- a fuel gas channel for supplying the fuel gas from a central region to an outer circumferential region on a surface of said anode; and
- an oxygen-containing gas channel for supplying an oxygen-containing gas from a central region to an outer circumferential region on a surface of said cathode.

9. A fuel cell according to claim 8, wherein a chamber, where the first exhaust gas can be retained, is formed among said annular portion, said seal portion, and the outer circumferential surface of said electrolyte electrode assembly.

10. A fuel cell according to claim 3, wherein said seal portion is provided between an outer end of said electrolyte electrode assembly and said annular portion, and the thickness of said seal portion is small in correspondence with the outer end.

11. A fuel cell according to claim 3, wherein said stopper is fixedly engaged with said separator with elasticity.

12. A fuel cell according to claim 3, wherein said stopper fixedly engaged with said separator a crimping process.

13. A fuel cell according to claim 3, wherein said stopper is fixedly engaged with said separator such that said stopper is overlapped with a curved end of said separator.

14. A fuel cell formed by stacking an electrolyte electrode assembly and separators, said electrolyte electrode assembly including an anode a cathode, and an electrolyte interposed between said anode and said cathode, said fuel cell comprising:
- an exhaust gas separation member provided between said separators, wherein said exhaust gas separation member comprises:
- an annular portion formed around an outer circumferential portion of said electrolyte electrode assembly, and having an opening for discharging a first exhaust gas which has been consumed at one electrode of said anode and said cathode to an outside of said electrolyte electrode assembly;
- a seal portion formed integrally with said annular portion for preventing the first exhaust gas from entering another electrode of said anode and said cathode; and
- a stopper provided at an end of said annular portion for allowing said exhaust gas separation member to be fixedly engaged with said separator adjacent to the one electrode.

15. A fuel cell according to claim 14, wherein said exhaust gas separation member has elastic properties by combination of said annular portion, said seal portion, and the stopper.

16. A fuel cell according to claim 14, wherein densification treatment is applied to an outer circumferential surface of the other electrode for preventing leakage of a second exhaust gas which has been consumed at the other electrode.

17. A fuel cell according to claim 14, wherein said separator comprises:
- a fuel gas channel for supplying the fuel gas from a central region to an outer circumferential region on a surface of said anode; and
- an oxygen-containing gas channel for supplying an oxygen-containing gas from a central region to an outer circumferential region on a surface of said cathode.

18. A fuel cell according to claim 17, wherein a chamber, where the first exhaust gas can be retained, is formed among said annular portion, said seal portion, and the outer circumferential surface of said electrolyte electrode assembly.

19. A fuel cell according to claim 14, wherein said seal portion is provided between an outer end of said electrolyte electrode assembly and said annular portion, and the thickness of said seal portion is small in correspondence with the outer end.

20. A fuel cell according to claim 14, wherein said stopper is fixedly engaged with said separator with elasticity.

21. A fuel cell according to claim 14, wherein said stopper is fixedly engaged with said separator by a crimping process.

22. A fuel cell according to claim 14, wherein said stopper is fixedly engaged with said separator such that said stopper is overlapped with a curved end of said separator.

23. A fuel cell according to claim 14, wherein an insulator is interposed between said stopper and said separator.

* * * * *